(12) United States Patent
Emigholz et al.

(10) Patent No.: US 7,349,746 B2
(45) Date of Patent: Mar. 25, 2008

(54) SYSTEM AND METHOD FOR ABNORMAL EVENT DETECTION IN THE OPERATION OF CONTINUOUS INDUSTRIAL PROCESSES

(75) Inventors: Kenneth F. Emigholz, Chevy Chase, MD (US); Robert K. Wang, Vienna, VA (US); Stephen S. Woo, Markham (CA); Richard B. McLain, Brambleton, VA (US); Sourabh K. Dash, Beaumont, TX (US); Thomas A. Kendi, Rotterdam (NL)

(73) Assignee: ExxonMobil Research and Engineering Company, Annandale, NJ (US)

( * ) Notice: Subject to any disclaimer, the term of this patent is extended or adjusted under 35 U.S.C. 154(b) by 90 days.

(21) Appl. No.: 11/212,189

(22) Filed: Aug. 26, 2005

(65) Prior Publication Data

US 2006/0058898 A1 Mar. 16, 2006

Related U.S. Application Data

(60) Provisional application No. 60/609,172, filed on Sep. 10, 2004.

(51) Int. Cl.
*G05B 11/01* (2006.01)
*G01R 27/28* (2006.01)

(52) U.S. Cl. ........................................ 700/21; 702/182
(58) Field of Classification Search .................. 700/21, 700/28, 29, 80, 79, 78, 182, 183, 185
See application file for complete search history.

(56) References Cited

U.S. PATENT DOCUMENTS 3,175,968 A 3/1965 Berger (Continued)

FOREIGN PATENT DOCUMENTS

EP 0 428 135 A2 5/1991

(Continued)

OTHER PUBLICATIONS

Bell, Michael, Errington, Jamie, NOVA Chemicals Corporation; Reising, Dal Vernon, Mylaraswamy, Dinkar, Honeywell Laboratories; "Early Event Detection-A Prototype Implementation".

(Continued)

*Primary Examiner*—Thomas K. Pham
(74) *Attorney, Agent, or Firm*—Ronald D. Hantman; Gerald L. Harris

(57) ABSTRACT

Thousands of process and equipment measurements are gathered by the modern digital process control systems that are deployed in refineries and chemical plants. Several years of these data are historized in databases for analysis and reporting. These databases can be mined for the data patterns that occur during normal operation and those patterns used to determine when the process is behaving abnormally.

These normal operating patterns are represented by sets of models. These models include simple engineering equations, which express known relationships that should be true during normal operations and multivariate statistical models based on a variation of principle component analysis. Equipment and process problems can be detected by comparing the data gathered on a minute by minute basis to predictions from these models of normal operation. The deviation between the expected pattern in the process operating data and the actual data pattern are interpreted by fuzzy Petri nets to determine the normality of the process operations. This is then used to help the operator localize and diagnose the root cause of the problem.

48 Claims, 22 Drawing Sheets

U.S. PATENT DOCUMENTS

| | | | |
|---|---|---|---|
| 5,023,045 | A | 6/1991 | Watanabe et al. |
| 5,333,240 | A | 7/1994 | Matsumoto et al. |
| 5,351,247 | A | 9/1994 | Dow et al. |
| 5,457,625 | A | 10/1995 | Lim et al. |
| 5,465,321 | A * | 11/1995 | Smyth .................. 706/20 |
| 5,539,877 | A | 7/1996 | Winokur et al. |
| 5,817,958 | A | 10/1998 | Uchida et al. |
| 5,859,964 | A | 1/1999 | Wang et al. |
| 5,949,677 | A * | 9/1999 | Ho ........................ 700/80 |
| 5,949,678 | A | 9/1999 | Wold et al. |
| 5,950,147 | A * | 9/1999 | Sarangapani et al. ....... 702/176 |
| 6,115,656 | A * | 9/2000 | Sudolsky .................. 701/35 |
| 6,368,975 | B1 | 4/2002 | Balasubramhanya et al. |
| 6,466,877 | B1 | 10/2002 | Chen et al. |
| 6,505,145 | B1 | 1/2003 | Bjornson |
| 6,521,080 | B2 | 2/2003 | Balasubramhanya et al. |
| 6,522,978 | B1 | 2/2003 | Chen et al. |
| 6,564,119 | B1 | 5/2003 | Vaculik et al. |
| 6,606,580 | B1 * | 8/2003 | Zedda et al. ................ 702/185 |
| 6,625,569 | B2 | 9/2003 | James et al. |
| 6,636,842 | B1 | 10/2003 | Zambrano et al. |
| 6,681,344 | B1 | 1/2004 | Andrew |
| 6,735,541 | B2 | 5/2004 | Kern et al. |
| 6,760,639 | B2 * | 7/2004 | Kallela et al. ............. 700/111 |
| 6,809,837 | B1 | 10/2004 | Mestha et al. |
| 6,813,532 | B2 | 11/2004 | Eryurek et al. |
| 6,904,386 | B2 | 6/2005 | Mylaraswamy |
| 6,907,383 | B2 | 6/2005 | Eryurek et al. |
| 6,917,839 | B2 * | 7/2005 | Bickford ..................... 700/30 |
| 6,925,338 | B2 | 8/2005 | Eryurek et al. |
| 6,954,713 | B2 | 10/2005 | Eryurek |
| 6,973,396 | B1 | 12/2005 | Shah et al. |
| 6,978,210 | B1 | 12/2005 | Suter et al. |
| 6,980,938 | B2 | 12/2005 | Cutler |
| 7,079,984 | B2 | 7/2006 | Eryurek |
| 7,085,610 | B2 | 8/2006 | Eryurek et al. |
| 7,096,074 | B2 * | 8/2006 | Yulevitch et al. ........... 700/21 |
| 7,181,654 | B2 | 2/2007 | Ford, Jr. et al. |
| 7,243,048 | B2 | 7/2007 | Foslien et al. |
| 2002/0077792 | A1 * | 6/2002 | Qiu .............................. 703/2 |
| 2003/0225466 | A1 | 12/2003 | Yulevitch et al. |
| 2004/0002776 | A1 | 1/2004 | Bickford |
| 2004/0078171 | A1 | 4/2004 | Wegerich et al. |
| 2004/0078683 | A1 | 4/2004 | Buia et al. |
| 2004/0172229 | A1 | 9/2004 | Aragones et al. |
| 2005/0141782 | A1 | 6/2005 | Guralnik et al. |
| 2005/0149297 | A1 | 7/2005 | Guralnik et al. |
| 2005/0197805 | A1 | 9/2005 | Eryurek et al. |
| 2005/0267702 | A1 | 12/2005 | Shah et al. |
| 2005/0267710 | A1 | 12/2005 | Heavner, III et al. |
| 2006/0020423 | A1 | 1/2006 | Sharpe, Jr. |
| 2006/0036403 | A1 | 2/2006 | Wegerich et al. |
| 2006/0073013 | A1 | 4/2006 | Emigholz et al. |
| 2007/0005266 | A1 | 1/2007 | Blevins et al. |
| 2007/0088448 | A1 | 4/2007 | Mylaraswamy et al. |
| 2007/0088528 | A1 | 4/2007 | Miller |
| 2007/0088534 | A1 | 4/2007 | MacArthur et al. |
| 2007/0124113 | A1 | 5/2007 | Foslien et al. |

FOREIGN PATENT DOCUMENTS

| | | |
|---|---|---|
| JP | 02-2408 A | 1/1990 |
| JP | 10-143343 A | 5/1998 |

OTHER PUBLICATIONS

Bell, Michael B., NOVA Chemicals; Foslien, Wendy K., Honeywell; "Early Event Detection-Results From A Prototype Implementation", 2005 Spring National Meeting Atlanta GA, Apr. 10-14, 17th Annual Ethylene Producers' Conference Session TA006-Ethylene Plant Process Control.

Mylaraswamy, Dinkar, Bullemer, Peter, Honeywell Laboratories; Emigholz, Ken, EMRE, ExxonMobil, "Fielding a Multiple State Estimator Platform", NPRA Computer Conference, Chicago, IL, Nov. 2000.

* cited by examiner

Probability Distribution of Process Data
Combined Continuous and Disturbed Operations

SYSTEM AND METHOD FOR ABNORMAL EVENT DETECTION IN THE OPERATION OF CONTINUOUS INDUSTRIAL PROCESSES

CROSS-REFERENCE TO RELATED APPLICATION

This application claims the benefit of U.S. Provisional application 60/609,172 filed Sep. 10, 2004.

BACKGROUND OF THE INVENTION

This invention relates, in its broadest aspect, to preventing the escalation of process and equipment problems into serious incidents. It achieves this by first providing the operator with an early warning of a developing process or equipment problem, before the alarm system is activated, and by then providing the operator with key information for localizing and diagnosing the root cause of the problem.

In the petrochemical industry, abnormal operations can have a significant economic impact (lost production, equipment damage), can cause environmental releases, and, in more severe cases, can endanger human life. An industrial consortium has estimated that abnormal events can cost between 3 and 8% of production capacity, which is over $10 billion for the US petrochemical industry.

Abnormal situations commonly result from the failure of field devices (such as instrumentation, control valves, and pumps) or some form of process disturbance that causes the plant operations to deviate from the normal operating state. In particular, the undetected failure of key instrumentation and other devices, which are part of the process control system can cause the control system to drive the process into an undesirable and dangerous state. Early detection of these failures enables the operations team to intervene before the control system escalates the failure into a more severe incident.

The current commercial practice is to notify the console operator of a process problem through process alarms. These process alarms are defined by setting safe operating ranges on key process measurements (temperatures, pressures, flows, levels, and compositions). An alarm is given to the operator when the safe operating range of a measurement is violated. In current commercial practice, setting these alarm ranges is a delicate balance between giving the operator sufficient time to respond to the process problem and overwhelming him with a flood of alarms. Often, the safe operating ranges of key process measurements are set wide to reduce low importance alarms. The negative result of these wide safe-operating ranges is that abnormal conditions can advance too far, and the operator is not left with enough time to take corrective actions to mitigate the abnormal event.

In the past decade, the application of multivariate statistical models principal components models, PCA, and partial least squares, PLS) for monitoring complex industrial processes has started to take place in a few industries, notably steel casting (U.S. Pat. No. 6,564,119, pulp and paper (U.S. Pat. No. 6,522,978 and semiconductor manufacturing (U.S. Pat. No. 5,859,964. The general practice is to first identify a particular process problem, and then to build a PCA model specifically designed to catch the process problem. This model is executed online to generate statistical indices of the operation. A notification is given to the process operator based on the violation of key statistical limits (sum of square prediction error and Hotelling T square) computed from the model. The operators are then informed of a prioritized list of those original inputs, which are the greatest contributors to the statistical indices.

For each industry, the characteristics of the process operation and the related process data require modifications to the method for developing multivariate statistical models and their subsequent use in an online system. Without these modifications, there can be a number of technical problems limiting the usefulness in applying models for online process monitoring. These technical problems can cause the statistical indices have significant Type I and Type II errors (false positives and missed abnormal events).

SUMMARY OF THE INVENTION

Events and disturbances of various magnitudes are constantly affecting process operations. Most of the time these events and disturbances are handled by the process control system. However, the operator is required to make an unplanned intervention in the process operations whenever the process control system cannot adequately handle the process event. We define this situation as an abnormal operation and the cause defined as an abnormal event.

A methodology and system has been developed to create and to deploy on-line, sets of models, which are used to detect abnormal operations and help the operator isolate the location of the root cause in an industrial process, in particular, a continuous process. In a preferred embodiment, the invention is applied to a chemical or refining process. More specifically, to a petrochemical process. In a preferred embodiment, the models employ principle component analysis (PCA). These sets of models are composed of both simple models that represent known engineering relationships and principal component analysis (PCA) models that represent normal data patterns that exist within historical databases. The results from these many model calculations are combined into a small number of summary time trends that allow the process operator to easily monitor whether the process is entering an abnormal operation.

FIG. 1 shows how the information in the online system flows through the various transformations, model calculations, fuzzy Petri nets and consolidations to arrive at a summary trend which indicates the normality/abnormality of the process areas. The heart of this system is the various models used to monitor the normality of the process operations.

The PCA models described in this invention are intended to broadly monitor continuous refining and chemical processes and to rapidly detect developing equipment and process problems. The intent is to provide blanket monitoring of all the process equipment and process operations under the span of responsibility of a particular console operator post. This can involve many major refining or chemical process operating units (e.g. distillation towers, reactors, compressors, heat exchange trains, etc.) which have hundreds to thousands of process measurements. The monitoring is designed to detect problems which develop on a minutes to hours timescale, as opposed to long term performance degradation. The process and equipment problems do not need to be specified beforehand. This is in contrast to the use of PCA models cited in the literature which are structured to detect a specific important process problem and to cover a much smaller portion of the process operations.

To accomplish this objective, the method for PCA model development and deployment includes a number of novel extensions required for their application to continuous refining and chemical processes including:

- criteria for establishing the equipment scope of the PCA models criteria and methods for selecting, analyzing, and transforming measurement inputs
- developing of multivariate statistical models based on a variation of principle component models, PCA
- developing models based on simple engineering relationships restructuring the associated statistical indices
- preprocessing the on-line data to provide exception calculations and continuous on-line model updating
- using fuzzy Petri nets to interpret model indices as normal or abnormal
- using fuzzy Petri nets to combine multiple model outputs into a single continuous summary indication of normality/abnormality for a process area
- design of operator interactions with the models and fuzzy Petri nets to reflect operations and maintenance activities These extensions are necessary to handle the characteristics of continuous refining and chemical plant operations and the corresponding data characteristics so that PCA and simple engineering models can be used effectively. These extensions provide the advantage of preventing many of the Type I and Type II errors and quicker indications of abnormal events.

This section will not provide a general background to PCA. For that, readers should refer to a standard textbook on PCA, see e.g. E. Jackson's "*A User's Guide to Principal Component Analysis*" John Wiley & Sons, 1991.

The classical PCA technique makes the following statistical assumptions all of which are violated to some degree by the data generated from normal continuous refining and chemical plant process operations:

1. The process is stationary—its mean and variance are constant over time.
2. The cross correlation among variables is linear over the range of normal process operations
3. Process noise random variables are mutually independent.
4. The covariance matrix of the process variables is not degenerate (i.e. positive semi-definite).
5. The data are scaled "appropriately" (the standard statistical approach being to scale to unit variance).
6. There are no (uncompensated) process dynamics (a standard partial compensation for this being the inclusion of lag variables in the model)
7. All variables have some degree of cross correlation.
8. The data have a multivariate normal distribution Consequently, in the selection, analysis and transformation of inputs and the subsequent in building the PCA model, various adjustments are made to evaluate and compensate for the degree of violation.

Once these PCA models are deployed on-line the model calculations require specific exception processing to remove the effect of known operation and maintenance activities, to disable failed or "bad acting" inputs, to allow the operator observe and acknowledge the propagation of an event through the process and to automatically restore the calculations once the process has returned to normal.

Use of PCA models is supplemented by simple redundancy checks that are based on known engineering relationships that must be true during normal operations. These can be as simple as checking physically redundant measurements, or as complex as material and engineering balances. The simplest form of redundancy checks are simple 2×2 checks, e.g.

temperature 1=temperature 2
flow 1=valve characteristic curve 1 (valve 1 position)
material flow into process unit 1=material flow out of process unit 1

These are shown to the operator as simple x-y plots, such as the valve flow plot in FIG. 2. Each plot has an area of normal operations, shown on this plot by the gray area. Operations outside this area are signaled as abnormal.

Multiple redundancy can also be checked through a single multidimensional model. Examples of multidimensional redundancy are:

pressure 1=pressure 2= . . . =pressure n
material flow into process unit 1=material flow out of process unit 1= . . . =material flow into process unit 2

Multidimensional checks are represented with "PCA like" models. In FIG. 3, there are three independent and redundant measures, X1, X2, and X3. Whenever X3 changes by one, X1 changes by $a_{13}$ and X2 changes by $a_{23}$. This set of relationships is expressed as a PCA model with a single principle component direction, P. This type of model is presented to the operator in a manner similar to the broad PCA models. As with the two dimensional redundancy checks the gray area shows the area of normal operations. The principle component loadings of P are directly calculated from the engineering equations, not in the traditional manner of determining P from the direction of greatest variability.

The characteristics of the process operation require exception operations to keep these relationships accurate over the normal range of process operations and normal field equipment changes and maintenance activities. Examples of exception operations are:

opening of bypass valves around flow meters
compensating for upstream/downstream pressure changes
recalibration of field measurements
redirecting process flows based on operating modes The PCA models and the engineering redundancy checks are combined using fuzzy Petri nets to provide the process operator with a continuous summary indication of the normality of the process operations under his control (FIG. 4).

Multiple statistical indices are created from each PCA model so that the indices correspond to the configuration and hierarchy of the process equipment that the process operator handles. The sensitivity of the traditional sum of Squared Prediction Error, SPE, index is improved by creating subset indices, which only contain the contribution to the SPE index for the inputs which come from designated portions of the complete process area covered by the PCA model. Each statistical index from the PCA models is fed into a fuzzy Petri net to convert the index into a zero to one scale, which continuously indicates the range from normal operation (value of zero) to abnormal operation (value of one).

Each redundancy check is also converted to a continuous normal—abnormal indication using fuzzy nets. There are two different indices used for these models to indicate abnormality; deviation from the model and deviation outside the operating range (shown on FIG. 3). These deviations are equivalent to the sum of the square of the error and the Hotelling T square indices for PCA models. For checks with dimension greater than two, it is possible to identify which input has a problem. In FIG. 3, since the X3-X2 relationship is still within the normal envelope, the problem is with input X1. Each deviation measure is converted by the fuzzy Petri net into a zero to one scale that will continuously indicate the range from normal operation (value of zero) to abnormal operation (value of one).

For each process area under the authority of the operator, the applicable set of normal—abnormal indicators is combined into a single normal—abnormal indicator. This is done by using fuzzy Petri logic to select the worst case indication of abnormal operation. In this way the operator has a high level summary of all the checks within the process area. This section will not provide a general background to fuzzy Petri nets. For that, readers should refer to a standard reference on fuzzy Petri nets, see e.g. Cardoso, et al, *Fuzzy Petri Nets: An Overview*, 13th Word Congress of IFAC, Vol. 1: Identification II, Discrete Event Systems, San Francisco, Calif. USA, Jun. 30-Jul. 5, 1996, pp 443-448.

The overall process for developing an abnormal event application is shown in FIG. 5. The basic development strategy is iterative where the developer starts with a rough model, then successively improves that model's capability based on observing how well the model represents the actual process operations during both normal operations and abnormal operations. The models are then restructured and retrained based on these observations.

DETAILED DESCRIPTION OF THE PREFERRED EMBODIMENTS

Figure 1:
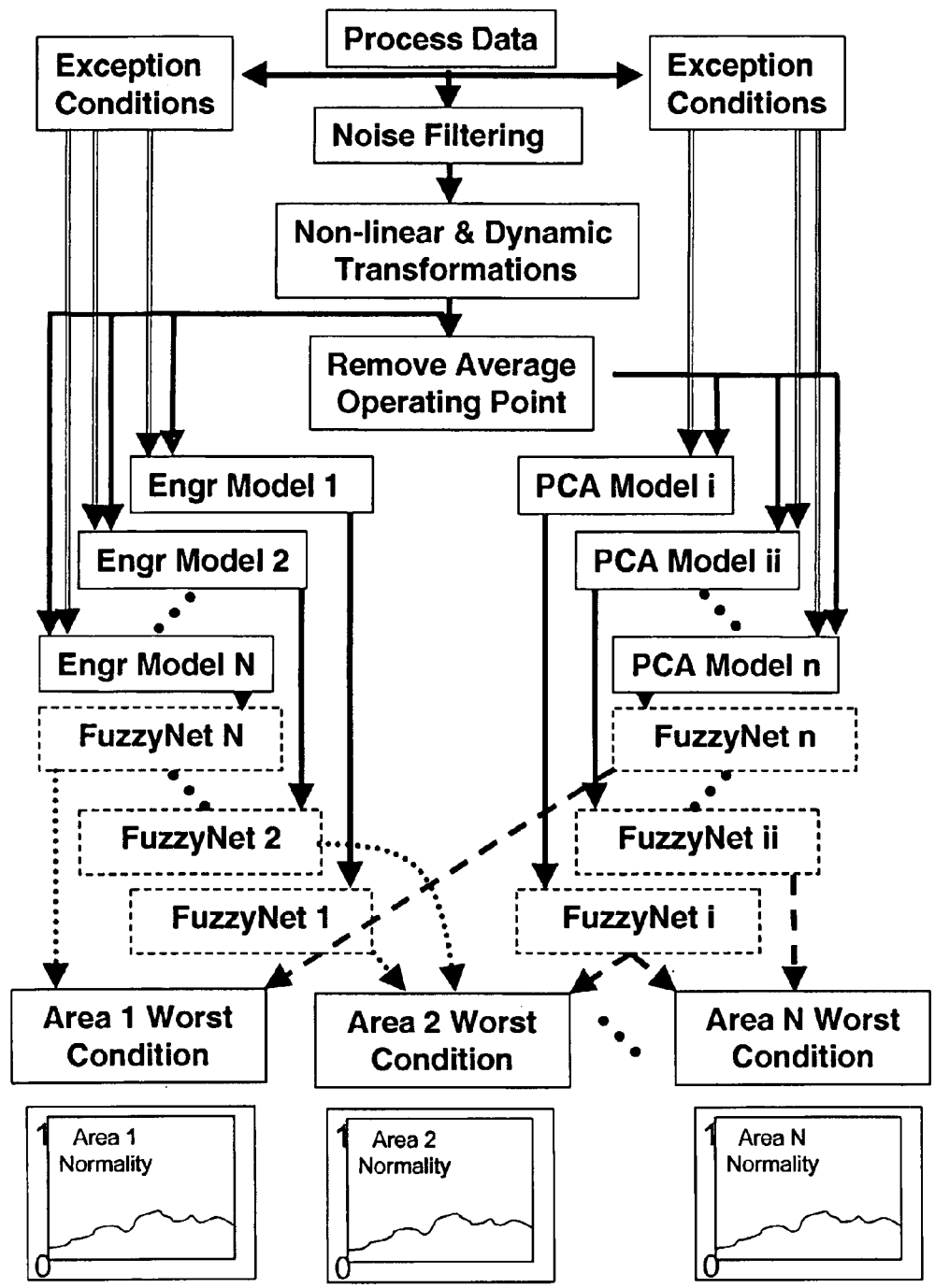
FIG. 1 shows how the information in the online system flows through the various transformations, model calculations, fuzzy Petri nets and consolidation to arrive at a summary trend which indicates the normality/abnormality of the process areas.

Developing PCA Models for Abnormal Event Detection

I. Conceptual PCA Model Design

The overall design goals are to:
provide the console operator with a continuous status (normal vs. abnormal) of process operations for all of the process units under his operating authority
provide him with an early detection of a rapidly developing (minutes to hours) abnormal event within his operating authority
provide him with only the key process information needed to diagnose the root cause of the abnormal event.

Actual root cause diagnosis is outside the scope of this invention. The console operator is expected to diagnosis the process problem based on his process knowledge and training.

Having a broad process scope is important to the overall success of abnormal operation monitoring. For the operator to learn the system and maintain his skills, he needs to regularly use the system. Since specific abnormal events occur infrequently, abnormal operations monitoring of a small portion of the process would be infrequently used by the operator, likely leading the operator to disregard the system when it finally detects an abnormal event. This broad scope is in contrast to the published modeling goal which is to design the model based on detecting a specific process problem of significant economic interest (see, e.g., Kourti, "*Process Analysis and Abnormal Situation Detection: From Theory to Practice*", IEEE Control Systems Magazine, Oct. 2002, pp. 10-25.)

There are thousands of process measurements within the process units under a single console operator's operating authority. Continuous refining and chemical processes exhibit significant time dynamics among these measurements, which break the cross correlation among the data. This requires dividing the process equipment into separate PCA models where the cross correlation can be maintained.

Conceptual model design is composed of four major decisions:
Subdividing the process equipment into equipment groups with corresponding PCA models
Subdividing process operating time periods into process operating modes requiring different PCA models
Identifying which measurements within an equipment group should be designated as inputs to each PCA model
Identifying which measurements within an equipment group should act as flags for suppressing known events or other exception operations A. Process Unit Coverage The initial decision is to create groups of equipment that will be covered by a single PCA model. The specific process units included requires an understanding of the process integration/interaction. Similar to the design of a multivariable constraint controller, the boundary of the PCA model should encompass all significant process interactions and key upstream and downstream indications of process changes and disturbances.

The following rules are used to determined these equipment groups:
Equipment groups are defined by including all the major material and energy integrations and quick recycles in the same equipment group (also referred to as key functional sections or operational sections). If the process uses a multivariable constraint controller, the controller model will explicitly identify the interaction points among the process units. Otherwise the interactions need to be identified through an engineering analysis of the process.

Process groups should be divided at a point where there is a minimal interaction between the process equipment groups. The most obvious dividing point occurs when the only interaction comes through a single pipe containing the feed to the next downstream unit. In this case the temperature, pressure, flow, and composition of the feed are the primary influences on the downstream equipment group and the pressure in the immediate downstream unit is the primary influence on the upstream equipment group. These primary influence measurements should be included in both the upstream and downstream equipment group PCA models.

Include the influence of the process control applications between upstream and downstream equipment groups. The process control applications provide additional influence paths between upstream and downstream equipment groups. Both feedforward and feedback paths can exist. Where such paths exist the measurements which drive these paths need to be included in both equipment groups. Analysis of the process control applications will indicate the major interactions among the process units.

Divide equipment groups wherever there are significant time dynamics (e.g. storage tanks, long pipelines etc.). The PCA models primarily handle quick process changes (e.g. those which occur over a period of minutes to hours). Influences, which take several hours, days or even weeks to have their effect on the process, are not suitable for PCA models. Where these influences are important to the normal data patterns, measurements of these effects need to be dynamically compensated to get their effect time synchronized with the other process measurements (see the discussion of dynamic compensation).

B. Process Operating Modes

Process operating modes are defined as specific time periods where the process behavior is significantly different. Examples of these are production of different grades of product (e.g. polymer production), significant process transitions (e.g. startups, shutdowns, feedstock switches), processing of dramatically different feedstock (e.g. cracking naphtha rather than ethane in olefins production), or different configurations of the process equipment (different sets of process units running).

Where these significant operating modes exist, it is likely that separate PCA models will need to be developed for each major operating mode. The fewer models needed the better. The developer should assume that a specific PCA model could cover similar operating modes. This assumption must be tested by running new data from each operating mode through the model to see if it behaves correctly.

C. Historical Process Problems

In order for there to be organizational interest in developing an abnormal event detection system, there should be an historical process problem of significant economic impact. However, these significant problems must be analyzed to identify the best approach for attacking these problems. In particular, the developer should make the following checks before trying to build an abnormal event detection application:

1. Can the problem be permanently fixed? Often a problem exists because site personnel have not had sufficient time to investigate and permanently solve the problem. Once the attention of the organization is focused on the problem, a permanent solution is often found. This is the best approach.
2. Can the problem be directly measured? A more reliable way to detect a problem is to install sensors that can directly measure the problem in the process. This can also be used to prevent the problem through a process control application. This is the second best approach.
3. Can an inferential measurement be developed which will measure the approach to the abnormal operation? Inferential measurements are usually developed using partial least squares, PLS, models which are very close relatives to PCA abnormal event models. Other common alternatives for developing inferential measurements include Neural Nets and linear regression models. If the data exists which can be used to reliably measure the approach to the problem condition (e.g. tower flooding using delta pressure), this can then be used to not only detect when the condition exists but also as the base for a control application to prevent the condition from occurring. This is the third best approach.

Both direct measurements of problem conditions and inferential measurements of these conditions can be easily integrated into the overall network of abnormal detection models.

II. Input Data and Operating Range Selection

Within an equipment group, there will be thousands of process measurements. For the preliminary design:

Select all cascade secondary controller measurements, and especially ultimate secondary outputs (signals to field control valves) on these units Select key measurements used by the console operator to monitor the process (e.g. those which appear on his operating schematics)

Select any measurements used by the contact engineer to measure the performance of the process Select any upstream measurement of feedrate, feed temperature or feed quality Select measurements of downstream conditions which affect the process operating area, particularly pressures.

Select extra redundant measurements for measurements that are important

Select measurements that may be needed to calculate non-linear transformations.

Select any external measurement of a disturbance (e.g. ambient temperature)

Select any other measurements, which the process experts regard as important measures of the process condition From this list only include measurements which have the following characteristics:

The measurement does not have a history of erratic or problem performance

The measurement has a satisfactory signal to noise ratio

The measurement is cross-correlated with other measurements in the data set

The measurement is not saturated for more than 10% of the time during normal operations.

The measurement is not tightly controlled to a fixed setpoint, which rarely changes (the ultimate primary of a control hierarchy).

The measurement does not have long stretches of "Bad Value" operation or saturated against transmitter limits.

The measurement does not go across a range of values, which is known to be highly non-linear The measurement is not a redundant calculation from the raw measurements The signals to field control valves are not saturated for more than 10% of the time A. Evaluations for Selecting Model Inputs There are two statistical criteria for prioritizing potential inputs into the PCA Abnormal Detection Model, Signal to Noise Ratio and Cross-Correlation.

1) Signal to Noise Test

The signal to noise ratio is a measure of the information content in the input signal.

The signal to noise ratio is calculated as follows:

1. The raw signal is filtered using an exponential filter with an approximate dynamic time constant equivalent to that of the process. For continuous refining and chemical processes this time constant is usually in the range of 30 minutes to 2 hours. Other low pass filters can be used as well. For the exponential filter the equations are:

$$Y_n = P*Y_{n-1} + (1-P)*X_n \quad \text{Exponential filter equation} \quad \text{Equation 1}$$

$$P = \text{Exp}(-T_s/T_f) \quad \text{Filter constant calculation} \quad \text{Equation 2}$$

where:
- $Y_n$ the current filtered value
- $Y_{n-1}$ the previous filtered value
- $X_n$ the current raw value
- P the exponential filter constant
- $T_s$ the sample time of the measurement
- $T_f$ the filter time constant 2. A residual signal is created by subtracting the filtered signal from the raw signal $$R_n = X_n - Y_n \quad \text{Equation 3}$$

3. The signal to noise ratio is the ratio of the standard deviation of the filtered signal divided by the standard deviation of the residual signal $$S/N = \sigma_Y/\sigma_R \quad \text{Equation 4}$$

It is preferable to have all inputs exhibit a S/N which is greater than a predetermined minimum, such as 4. Those inputs with S/N less than this minimum need individual examination to determine whether they should be included in the model The data set used to calculate the S/N should exclude any long periods of steady-state operation since that will cause the estimate for the noise content to be excessively large.

2) Cross Correlation Test

The cross correlation is a measure of the information redundancy the input data set. The cross correlation between any two signals is calculated as:

1. Calculate the co-variance, $S_{ik}$, between each input pair, i and k $$S_{ik} = \frac{N*\Sigma(X_i*X_k) - (\Sigma X_i)*(\Sigma X_k)}{N*(N-1)} \quad \text{Equation 5}$$

2. Calculate the correlation coefficient for each pair of inputs from the co-variance:

$$CC_{ik} = S_{ik}/(S_{ii}*S_{kk})^{1/2} \quad \text{Equation 6}$$

There are two circumstances, which flag that an input should not be included in the model. The first circumstance occurs when there is no significant correlation between a particular input and the rest of the input data set. For each input, there must be at least one other input in the data set with a significant correlation coefficient, such as 0.4.

The second circumstance occurs when the same input information has been (accidentally) included twice, often through some calculation, which has a different identifier. Any input pairs that exhibit correlation coefficients near one (for example above 0.95) need individual examination to determine whether both inputs should be included in the model. If the inputs are physically independent but logically redundant (i.e., two independent thermocouples are independently measuring the same process temperature) then both these inputs should be included in the model.

If two inputs are transformations of each other (i.e., temperature and pressure compensated temperature) the preference is to include the measurement that the operator is familiar with, unless there is a significantly improved cross correlation between one of these measurements and the rest of the dataset. Then the one with the higher cross correlation should be included.

3) Identifying & Handling Saturated Variables

Refining and chemical processes often run against hard and soft constraints resulting in saturated values and "Bad Values" for the model inputs. Common constraints are: instrument transmitter high and low ranges, analyzer ranges, maximum and minimum control valve positions, and process control application output limits. Inputs can fall into several categories with regard to saturation which require special handling when pre-processing the inputs, both for model building and for the on-line use of these models.

Bad Values

For standard analog instruments (e.g., 4-20 milliamp electronic transmitters), bad values can occur because of two separate reasons:

The actual process condition is outside the range of the field transmitter

The connection with the field has been broken

When either of these conditions occur, the process control system could be configured on an individual measurement basis to either assign a special code to the value for that measurement to indicate that the measurement is a Bad Value, or to maintain the last good value of the measurement. These values will then propagate throughout any calculations performed on the process control system. When the "last good value" option has been configured, this can lead to erroneous calculations that are difficult to detect and exclude. Typically when the "Bad Value" code is propagated through the system, all calculations which depend on the bad measurement will be flagged bad as well.

Regardless of the option configured on the process control system, those time periods, which include Bad Values should not be included in training or test data sets. The developer needs to identify which option has been configured in the process control system and then configure data filters for excluding samples, which are Bad Values. For the on-line implementation, inputs must be pre-processed so that Bad Values are flagged as missing values, regardless of which option had been selected on the process control system.

Those inputs, which are normally Bad Value for extensive time periods should be excluded from the model.

Constrained Variables

Constrained variables are ones where the measurement is at some limit, and this measurement matches an actual process condition (as opposed to where the value has defaulted to the maximum or minimum limit of the transmitter range—covered in the Bad Value section). This process situation can occur for several reasons:

Portions of the process are normally inactive except under special override conditions, for example pressure relief flow to the flare system. Time periods where these override conditions are active should be excluded from the training and validation data set by setting up data filters. For the on-line implementation these override events are trigger events for automatic suppression of selected model statistics The process control system is designed to drive the process against process operating limits, for example product spec limits. These constraints typically fall into two categories:—those, which are occasionally saturated and those, which are normally saturated. Those inputs, which are normally saturated, should be excluded from the model. Those inputs, which are only occasionally saturated (for example less than 10% of the time) can be included in the model however, they should be scaled based on the time periods when they are not saturated.

B. Input from Process Control Applications

The process control applications have a very significant effect on the correlation structure of the process data. In particular:

The variation of controlled variables is significantly reduced so that movement in the controlled variables is primarily noise except for those brief time periods when the process has been hit with a significant process disturbance or the operator has intentionally moved the operating point by changing key setpoints.

The normal variation in the controlled variables is transferred by the control system to the manipulated variables (ultimately the signals sent to the control valves in the field).

Figure 6:
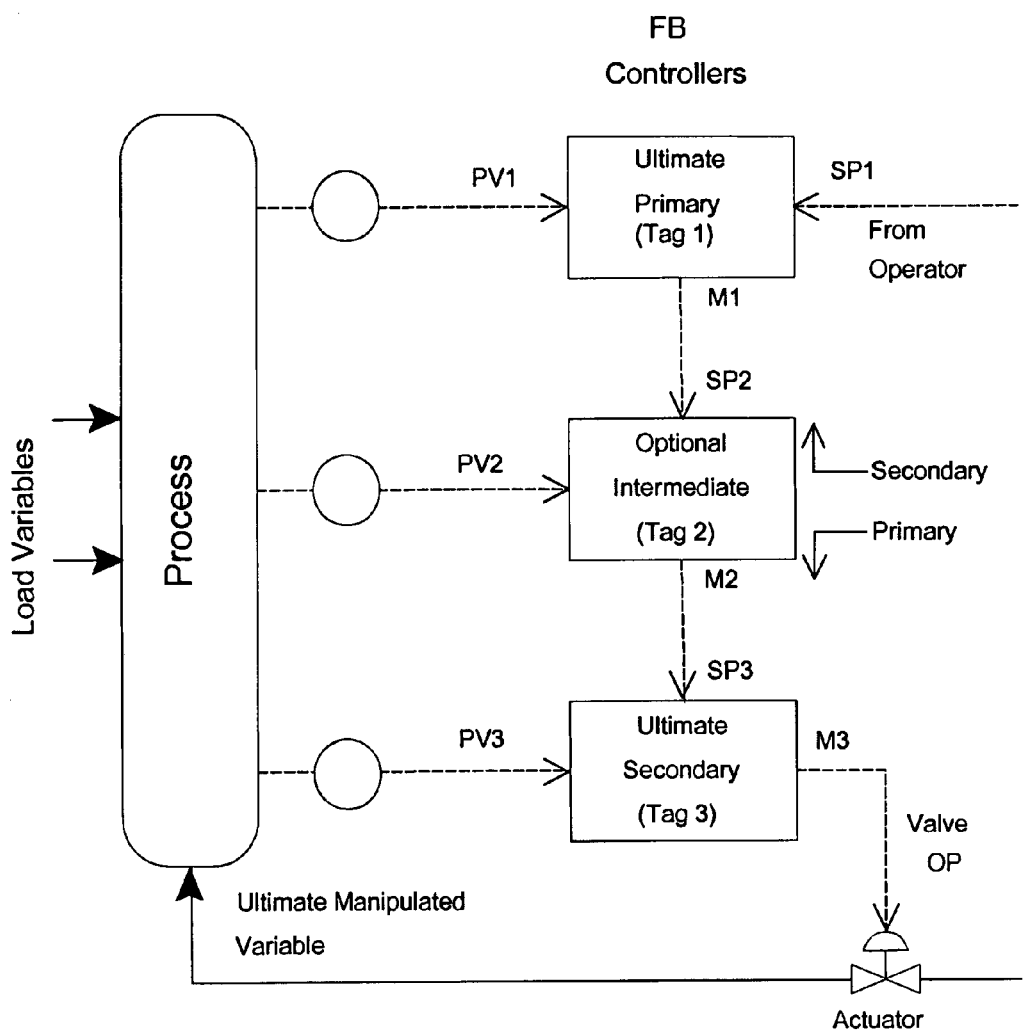
FIG. 6 shows a schematic diagram of the anatomy of a process control cascade.
Figure 7:
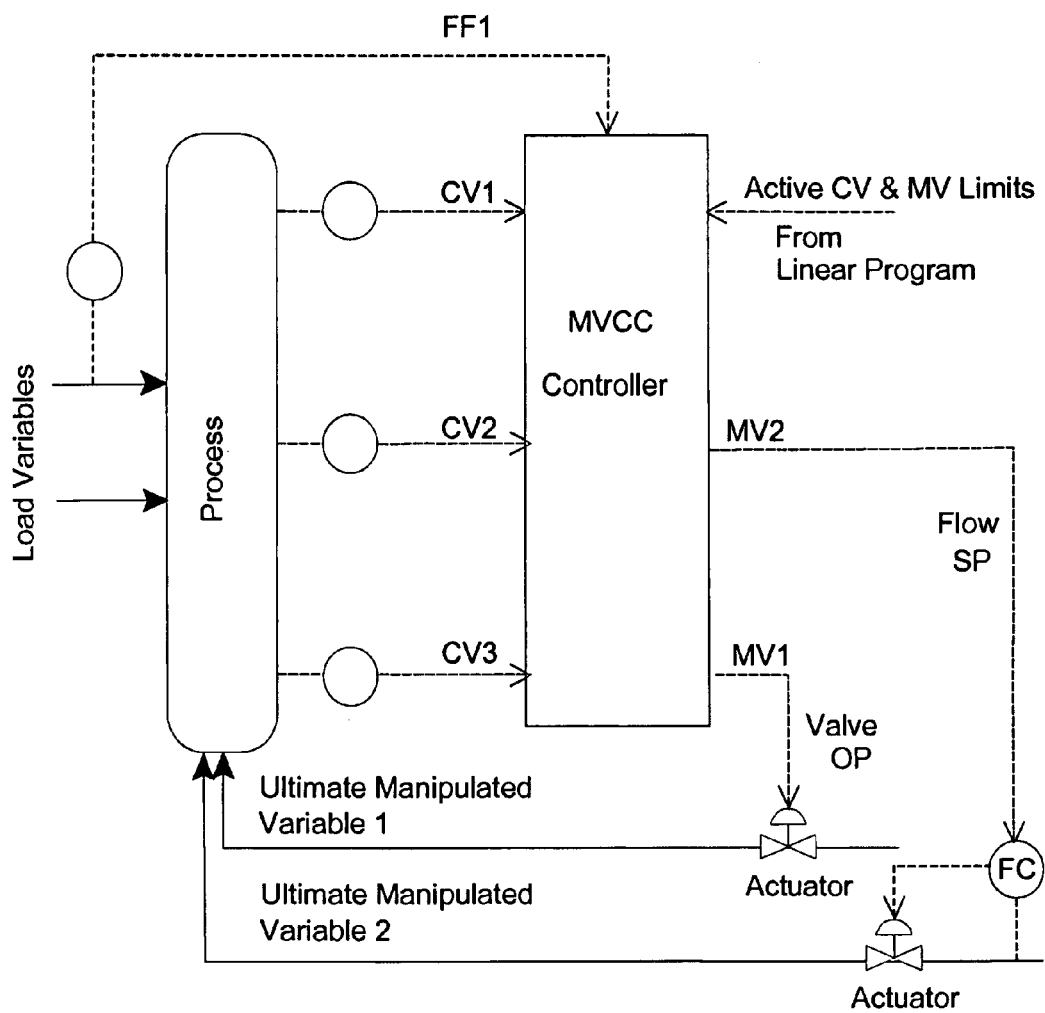
FIG. 7 shows a schematic diagram of the anatomy of a multivariable constraint controller, MVCC.

The normal operations of refinery and chemical processes are usually controlled by two different types of control structures: the classical control cascades (shown in FIG. 6) and the more recent multivariable constraint controllers, MVCC (shown in FIG. 7).

1) Selecting Model Inputs from Cascade Structures

FIG. 6 shows a typical "cascade" process control application, which is a very common control structure for refining and chemical processes. Although there are many potential model inputs from such an application, the only ones that are candidates for the model are the raw process measurements (the "PVs" in this figure) and the final output to the field valve.

Although it is a very important measurement, the PV of the ultimate primary of the cascade control structure is a poor candidate for inclusion in the model. This measurement usually has very limited movement since the objective of the control structure is to keep this measurement at the setpoint. There can be movement in the PV of the ultimate primary if its setpoint is changed but this usually is infrequent. The data patterns from occasional primary setpoint moves will usually not have sufficient power in the training dataset for the model to characterize the data pattern.

Because of this difficulty in characterizing the data pattern resulting from changes in the setpoint of the ultimate primary, when the operator makes this setpoint move, it is likely to cause a significant increase in the sum of squared prediction error, SPE, index of the model. Consequently, any change in the setpoint of the ultimate primary is a candidate trigger for a "known event suppression". Whenever the operator changes an ultimate primary setpoint, the "known event suppression" logic will automatically remove its effect from the SPE calculation.

Should the developer include the PV of the ultimate primary into the model, this measurement should be scaled based on those brief time periods during which the operator has changed the setpoint and until the process has moved close to the vale of the new setpoint (for example within 95% of the new setpoint change thus if the setpoint change is from 10 to 11, when the PV reaches 10.95)

There may also be measurements that are very strongly correlated (for example greater than 0.95 correlation coefficient) with the PV of the Ultimate Primary, for example redundant thermocouples located near a temperature measurement used as a PV for an Ultimate Primary. These redundant measurements should be treated in the identical manner that is chosen for the PV of the Ultimate Primary.

Cascade structures can have setpoint limits on each secondary and can have output limits on the signal to the field control valve. It is important to check the status of these potentially constrained operations to see whether the measurement associated with a setpoint has been operated in a constrained manner or whether the signal to the field valve has been constrained. Date during these constrained operations should not be used.

2) Selecting/Calculating Model Inputs from Multivariable Constraint Controllers, MVCC FIG. 7 shows a typical MVCC process control application, which is a very common control structure for refining and chemical processes. An MVCC uses a dynamic mathematical model to predict how changes in manipulated variables, MVs, (usually valve positions or setpoints of regulatory control loops) will change control variables, CVs (the dependent temperatures, pressures, compositions and flows which measure the process state). An MVCC attempts to push the process operation against operating limits. These limits can be either MV limits or CV limits and are determined by an external optimizer. The number of limits that the process operates against will be equal to the number of MVs the controller is allowed to manipulate minus the number of material balances controlled. So if an MVCC has 12 MVs, 30 CVs and 2 levels then the process will be operated against 10 limits. An MVCC will also predict the effect of measured load disturbances on the process and compensate for these load disturbances (known as feedforward variables, FF).

Whether or not a raw MV or CV is a good candidate for inclusion in the PCA model depends on the percentage of time that MV or CV is held against its operating limit by the MVCC. As discussed in the Constrained Variables section, raw variables that are constrained more than 10% of the time are poor candidates for inclusion in the PCA model. Normally unconstrained variables should be handled per the Constrained Variables section discussion.

If an unconstrained MV is a setpoint to a regulatory control loop, the setpoint should not be included, instead the measurement of that regulatory control loop should be included. The signal to the field valve from that regulatory control loop should also be included.

If an unconstrained MV is a signal to a field valve position, then it should be included in the model.

C. Redundant Measurements

The process control system databases can have a significant redundancy among the candidate inputs into the PCA model. One type of redundancy is "physical redundancy", where there are multiple sensors (such as thermocouples) located in close physical proximity to each other within the process equipment. The other type of redundancy is "calculational redundancy", where raw sensors are mathematically combined into new variables (e.g. pressure compensated temperatures or mass flows calculated from volumetric flow measurements).

As a general rule, both the raw measurement and an input which is calculated from that measurement should not be included in the model. The general preference is to include the version of the measurement that the process operator is most familiar with. The exception to this rule is when the raw inputs must be mathematically transformed in order to improve the correlation structure of the data for the model. In that case the transformed variable should be included in the model but not the raw measurement.

Physical redundancy is very important for providing cross validation information in the model. As a general rule, raw measurements, which are physically redundant should be included in the model. When there are a large number of physically redundant measurements, these measurements must be specially scaled so as to prevent them from overwhelming the selection of principle components (see the section on variable scaling). A common process example occurs from the large number of thermocouples that are placed in reactors to catch reactor runaways.

When mining a very large database, the developer can identify the redundant measurements by doing a cross-correlation calculation among all of the candidate inputs. Those measurement pairs with a very high cross-correlation (for example above 0.95) should be individually examined to classify each pair as either physically redundant or calculationally redundant.

III. Historical Data Collection

A significant effort in the development lies in creating a good training data set, which is known to contain all modes of normal process operations. This data set should:

Span the normal operating range: Datasets, which span small parts of the operating range, are composed mostly of noise. The range of the data compared to the range of the data during steady state operations is a good indication of the quality of the information in the dataset.

Include all normal operating modes (including seasonal mode variations). Each operating mode may have different correlation structures. Unless the patterns, which characterize the operating mode, are captured by the model, these unmodeled operating modes will appear as abnormal operations.

Only include normal operating data: If strong abnormal operating data is included in the training data, the model will mistakenly model these abnormal operations as normal operations. Consequently, when the model is later compared to an abnormal operation, it may not detect the abnormality operations.

History should be as similar as possible to the data used in the on-line system: The online system will be providing spot values at a frequency fast enough to detect the abnormal event. For continuous refining and chemical operations this sampling frequency will be around one minute. Within the limitations of the data historian, the training data should be as equivalent to one-minute spot values as possible.

The strategy for data collection is to start with a long operating history (usually in the range of 9 months to 18 months), then try to remove those time periods with obvious or documented abnormal events. By using such a long time period, the smaller abnormal events will not appear with sufficient strength in the training data set to significantly influence the model parameters most operating modes should have occurred and will be represented in the data.

A. Historical Data Collection Issues

1) Data Compression

Many historical databases use data compression to minimize the storage requirements for the data. Unfortunately, this practice can disrupt the correlation structure of the data. At the beginning of the project the data compression of the database should be turned off and the spot values of the data historized. Final models should be built using uncompressed data whenever possible. Averaged values should not be used unless they are the only data available, and then with the shortest data average available.

2) Length of Data History

For the model to properly represent the normal process patterns, the training data set needs to have examples of all the normal operating modes, normal operating changes and changes and normal minor disturbances that the process experiences. This is accomplished by using data from over a long period of process operations (e.g. 9-18 months). In particular, the differences among seasonal operations (spring, summer, fall and winter) can be very significant with refinery and chemical processes.

Sometimes these long stretches of data are not yet available (e.g. after a turnaround or other significant reconfiguration of the process equipment). In these cases the model would start with a short initial set of training data (e.g. 6 weeks) then the training dataset is expanded as further data is collected and the model updated monthly until the models are stabilized (e.g. the model coefficients don't change with the addition of new data)

3) Ancillary Historical Data

The various operating journals for this time period should also be collected. This will be used to designate operating time periods as abnormal, or operating in some special mode that needs to be excluded from the training dataset. In particular, important historical abnormal events can be selected from these logs to act as test cases for the models.

4) Lack of Specific Measurement History

Often setpoints and controller outputs are not historized in the plant process data historian. Historization of these values should immediately begin at the start of the project.

5) Operating Modes

Old data that no longer properly represents the current process operations should be removed from the training data set. After a major process modification, the training data and PCA model may need to be rebuilt from scratch. If a particular type of operation is no longer being done, all data from that operation should be removed from the training data set.

Operating logs should be used to identify when the process was run under different operating modes. These different modes may require separate models. Where the model is intended to cover several operating modes, the number of samples in the training dataset from each operating model should be approximately equivalent.

6) Sampling Rate

The developer should gather several months of process data using the site's process historian, preferably getting one minute spot values. If this is not available, the highest resolution data, with the least amount of averaging should be used.

7) Infrequently Sampled Measurements

Figure 8:
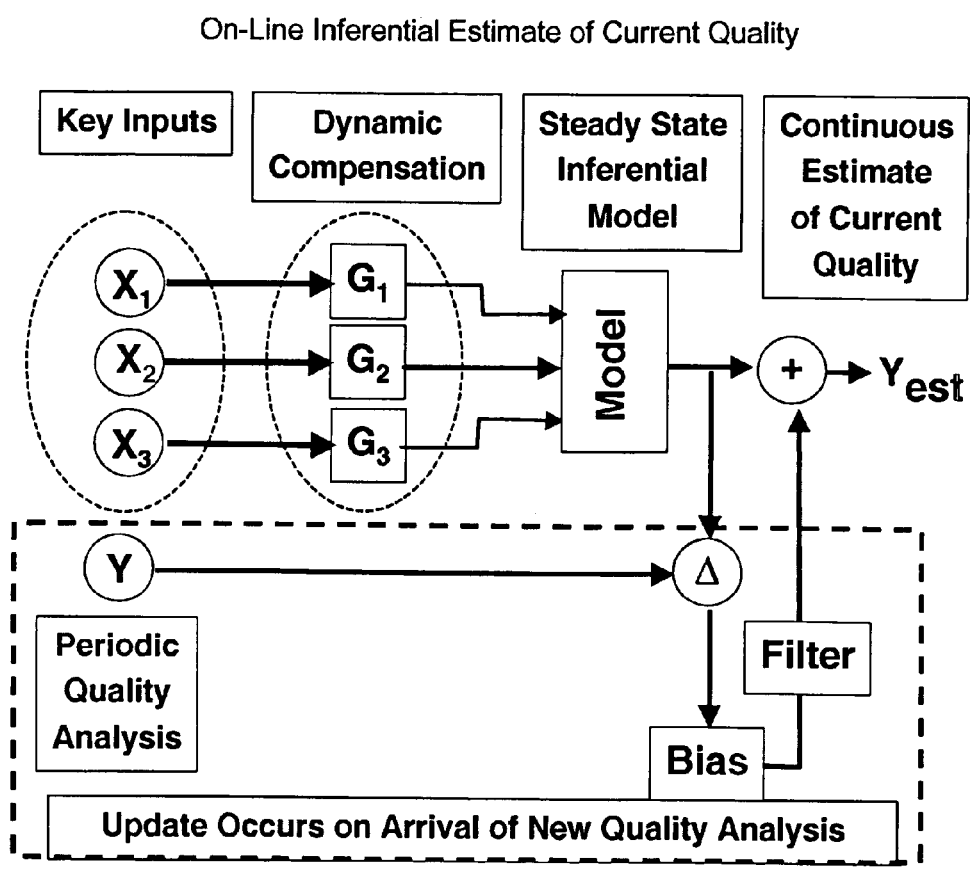
FIG. 8 shows a schematic diagram of the on-line inferential estimate of current quality.

Quality measurements (analyzers and lab samples) have a much slower sample frequency than other process measurements, ranging from tens of minutes to daily. In order to include these measurements in the model a continuous estimate of these quality measurements needs to be constructed. FIG. 8 shows the online calculation of a continuous quality estimate. This same model structure should be created and applied to the historical data. This quality estimate then becomes the input into the PCA model.

8) Model Triggered Data Annotation

Except for very obvious abnormalities, the quality of historical data is difficult to determine. The inclusion of abnormal operating data can bias the model. The strategy of using large quantities of historical data will compensate to some degree the model bias caused by abnormal operating in the training data set. The model built from historical data that predates the start of the project must be regarded with suspicion as to its quality. The initial training dataset should be replaced with a dataset, which contains high quality annotations of the process conditions, which occur during the project life.

The model development strategy is to start with an initial "rough" model (the consequence of a questionable training data set) then use the model to trigger the gathering of a high quality training data set. As the model is used to monitor the process, annotations and data will be gathered on normal operations, special operations, and abnormal operations. Anytime the model flags an abnormal operation or an abnormal event is missed by the model, the cause and duration of the event is annotated. In this way feedback on the model's ability to monitor the process operation can be incorporated in the training data. This data is then used to improve the model, which is then used to continue to gather better quality training data. This process is repeated until the model is satisfactory.

IV. Data & Process Analysis

A. Initial Rough Data Analysis

Using the operating logs and examining the process key performance indicators, the historical data is divided into periods with known abnormal operations and periods with no identified abnormal operations. The data with no identified abnormal operations will be the training data set.

Now each measurement needs to be examined over its history to see whether it is a candidate for the training data set. Measurements which should be excluded are:

- Those with many long periods of time as "Bad Value"
- Those with many long periods of time pegged to their transmitter high or low limits
- Those, which show very little variability (except those, which are tightly controlled to their setpoints)
- Those that continuously show very large variability relative to their operating range
- Those that show little or no cross correlation with any other measurements in the data set
- Those with poor signal to noise ratios While examining the data, those time periods where measurements are briefly indicating "Bad Value" or are briefly pegged to their transmitter high or low limits should also be excluded.

Once these exclusions have been made the first rough PCA model should be built. Since this is going to be a very rough model the exact number of principal components to be retained is not important. This will typically be around 5% of the number measurements included in the model. The number of PCs should ultimately match the number of degrees of freedom in the process, however this is not usually known since this includes all the different sources of process disturbances. There are several standard methods for determining how many principal components to include. Also at this stage the statistical approach to variable scaling should be used: scale all variables to unit variance.

$$X' = (X - X_{avg})/\sigma \qquad \text{Equation 7}$$

The training data set should now be run through this preliminary model to identify time periods where the data does not match the model. These time periods should be examined to see whether an abnormal event was occurring at the time. If this is judged to be the case, then these time periods should also be flagged as times with known abnormal events occurring. These time periods should be excluded from the training data set and the model rebuilt with the modified data.

B. Removing Outliers and Periods of Abnormal Operations

Eliminating obvious abnormal events will be done through the following:

Removing documented events. It is very rare to have a complete record of the abnormal event history at a site. However, significant operating problems should be documented in operating records such as operator logs, operator change journals, alarm journals, and instrument maintenance records. These are only providing a partial record of the abnormal event history.

Figure 9:
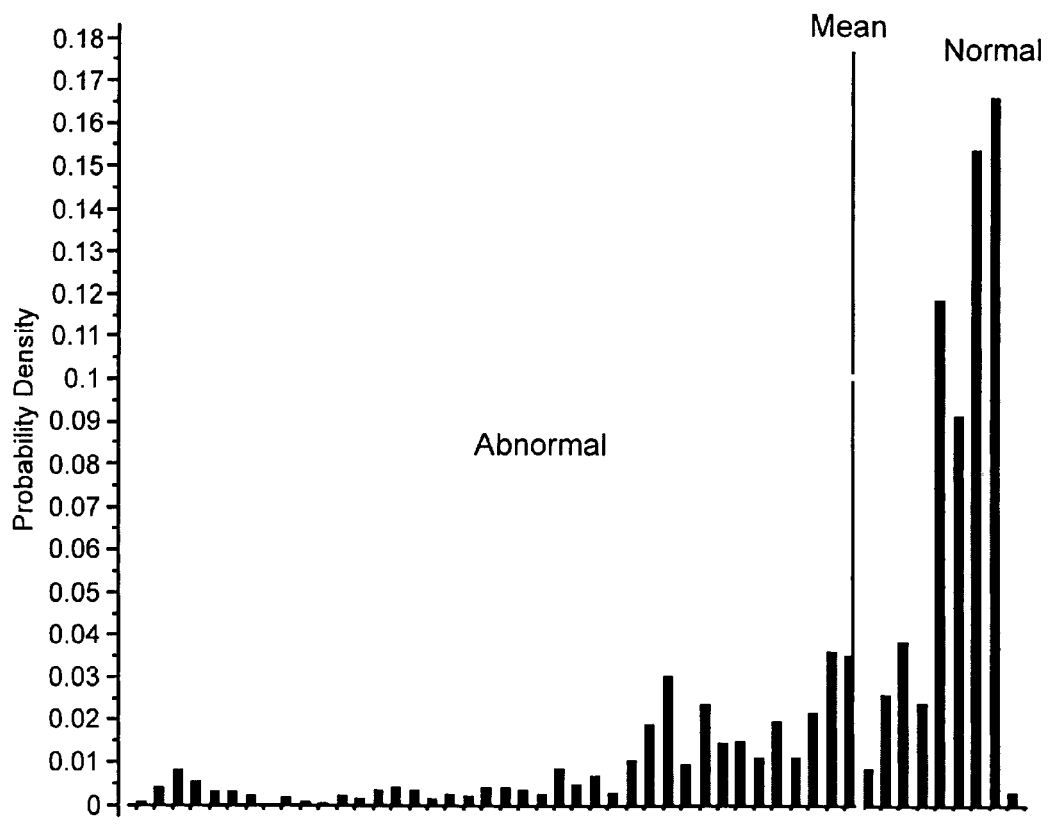
FIG. 9 shows the KPI analysis of historical data.

Removing time periods where key performance indicators, KPIs, are abnormal. Such measurements as feed rates, product rates, product quality are common key performance indicators. Each process operation may have additional KPIs that are specific to the unit. Careful examination of this limited set of measurements will usually give a clear indication of periods of abnormal operations. FIG. 9 shows a histogram of a KPI. Since the operating goal for this KPI is to maximize it, the operating periods where this KPI is low are likely abnormal operations. Process qualities are often the easiest KPIs to analyze since the optimum operation is against a specification limit and they are less sensitive to normal feed rate variations.

C. Compensating for Noise

By noise we are referring to the high frequency content of the measurement signal which does not contain useful information about the process. Noise can be caused by specific process conditions such as two-phase flow across an orifice plate or turbulence in the level. Noise can be caused by electrical inductance. However, significant process variability, perhaps caused by process disturbances is useful information and should not be filtered out.

There are two primary noise types encountered in refining and chemical process measurements: measurement spikes and exponentially correlated continuous noise. With measurement spikes, the signal jumps by an unreasonably large amount for a short number of samples before returning to a value near its previous value. Noise spikes are removed using a traditional spike rejection filter such as the Union filter.

Figure 10:
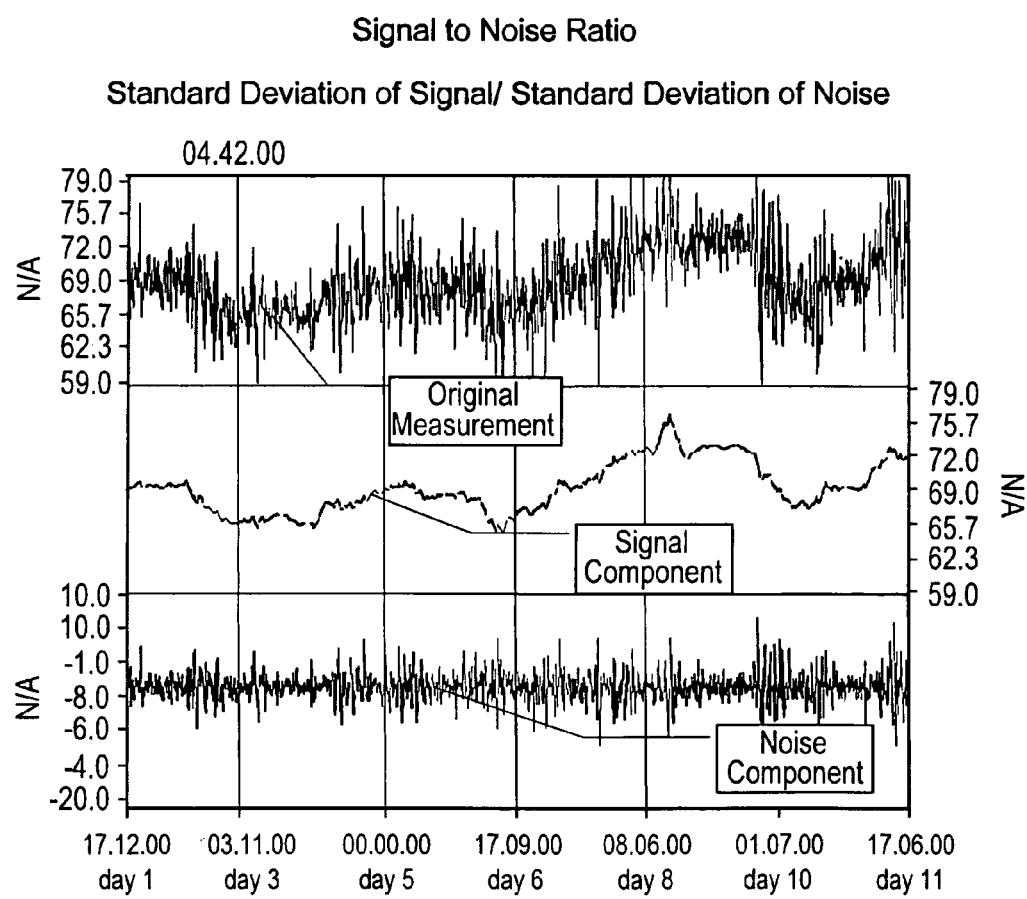
FIG. 10 shows a diagram of signal to noise ratio.

The amount of noise in the signal can be quantified by a measure known as the signal to noise ratio (see FIG. 10). This is defined as the ratio of the amount of signal variability due to process variation to the amount of signal variability due to high frequency noise. A value below four is a typical value for indicating that the signal has substantial noise, and can harm the model's effectiveness.

Whenever the developer encounters a signal with significant noise, he needs to make one of three choices. In order of preference, these are:

Fix the signal by removing the source of the noise (the best answer)
Remove/minimize the noise through filtering techniques
Exclude the signal from the model Typically for signals with signal to noise ratios between 2 and 4, the exponentially correlated continuous noise can be removed with a traditional low pass filter such as an exponential filter. The equations for the exponential filter are:

$$Y^n = P*Y^{n-1} + (1-P)*X^n \quad \text{Exponential filter equation} \quad \text{Equation 8}$$

$$P = \text{Exp}(-T_s/T_f) \quad \text{Filter constant calculation} \quad \text{Equation 9}$$

$Y^n$ is the current filtered value
$Y^{n-1}$ is the previous filtered value
$X^n$ is the current raw value
P is the exponential filter constant
$T_s$ is the sample time of the measurement
$T_f$ is the filter time constant Signals with very poor signal to noise ratios (for example less than 2) may not be sufficiently improved by filtering techniques to be directly included in the model. If the input is regarded as important, the scaling of the variable should be set to de-sensitize the model by significantly increasing the size of the scaling factor (typically by a factor in the range of 2-10).

D. Transformed Variables

Transformed variables should be included in the model for two different reasons.

First, based on an engineering analysis of the specific equipment and process chemistry, known non-linearities in the process should be transformed and included in the model. Since one of the assumptions of PCA is that the variables in the model are linearly correlated, significant process or equipment non-linearities will break down this correlation structure and show up as a deviation from the model. This will affect the usable range of the model.

Figure 2:
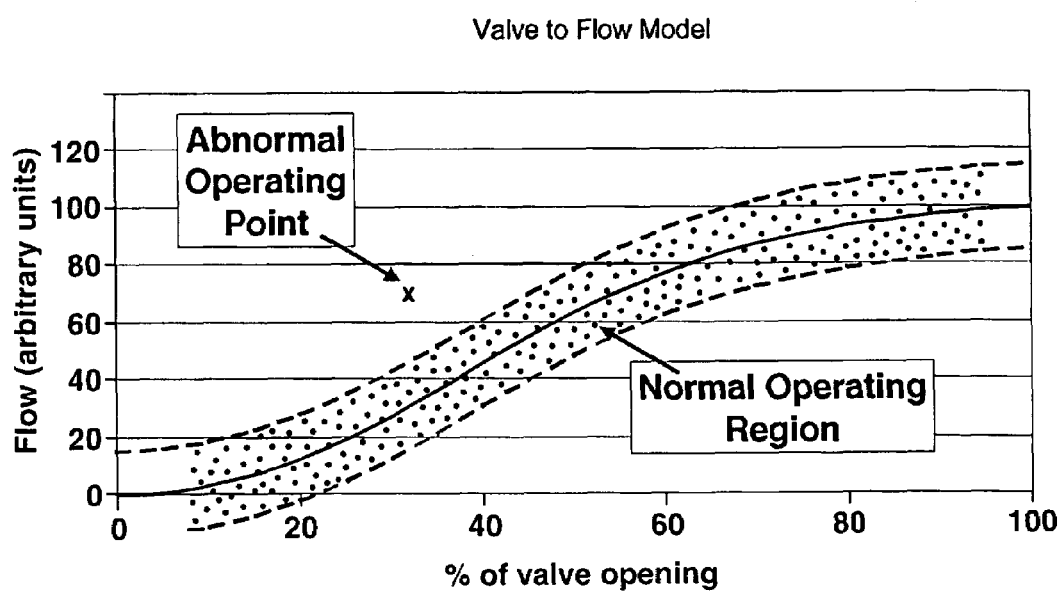
FIG. 2 shows a valve flow plot to the operator as a simple x-y plot.

Examples of well known non-linear transforms are:
Reflux to feed ratio in distillation columns
Log of composition in high purity distillation
Pressure compensated temperature measurement
Sidestream yield
Flow to valve position (FIG. 2)
Reaction rate to exponential temperature change Second, the data from process problems, which have occurred historically, should also be examined to understand how these problems show up in the process measurements. For example, the relationship between tower delta pressure and feedrate is relatively linear until the flooding point is reached, when the delta pressure will increase exponentially. Since tower flooding is picked up by the break in this linear correlation, both delta pressure and feed rate should be included. As another example, catalyst flow problems can often be seen in the delta pressures in the transfer line. So instead of including the absolute pressure measurements in the model, the delta pressures should be calculated and included.

E. Dynamic Transformations

Figure 11:
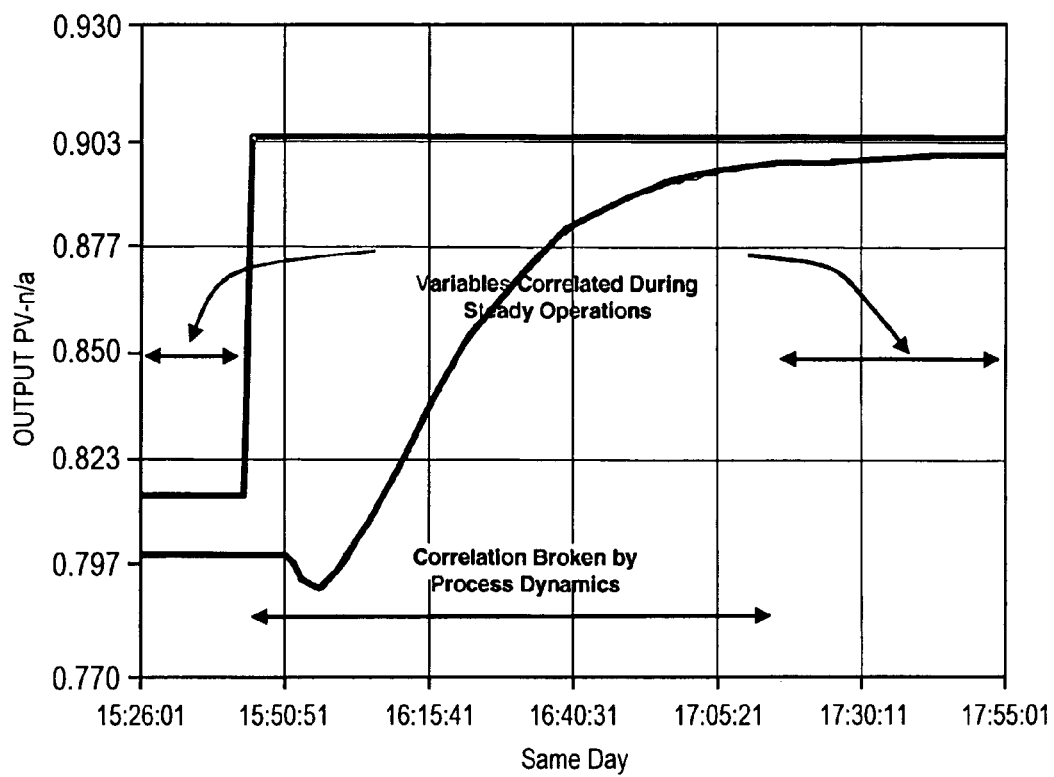
FIG. 11 shows how the process dynamics can disrupt the correlation between the current values of two measurements.

FIG. 11 shows how the process dynamics can disrupt the correlation between the current values of two measurements. During the transition time one value is constantly changing while the other is not, so there is no correlation between the current values during the transition. However these two measurements can be brought back into time synchronization by transforming the leading variable using a dynamic transfer function. Usually a first order with deadtime dynamic model (shown in Equation 9 in the Laplace transform format) is sufficient to time synchronize the data.

$$Y'(s) = \frac{e^{-\Theta S} Y(s)}{Ts + 1} \quad \text{Equation 9}$$

Y—raw data
Y'—time synchronized data
T—time constant
Θ—deadtime
S—Laplace Transform parameter This technique is only needed when there is a significant dynamic separation between variables used in the model. Usually only 1-2% of the variables requires this treatment. This will be true for those independent variables such as setpoints which are often changed in large steps by the operator and for the measurements which are significantly upstream of the main process units being modeled.

F. Removing Average Operating Point

Continuous refining and chemical processes are constantly being moved from one operating point to another. These can be intentional, where the operator or an optimization program makes changes to a key setpoints, or they can be due to slow process changes such as heat exchanger fouling or catalyst deactivation. Consequently, the raw data is not stationary. These operating point changes need to be removed to create a stationary dataset. Otherwise these changes erroneously appear as abnormal events.

The process measurements are transformed to deviation variables: deviation from a moving average operating point. This transformation to remove the average operating point is required when creating PCA models for abnormal event detection. This is done by subtracting the exponentially filtered value (see Equations 8 and 9 for exponential filter equations) of a measurement from its raw value and using this difference in the model.

$$X' = X - X_{filtered} \quad \text{Equation 10}$$

$X'$—measurement transformed to remove operating point changes
X—original raw measurement
$X_{filtered}$—exponentially filtered raw measurement The time constant for the exponential filter should be about the same size as the major time constant of the process. Often a time constant of around 40 minutes will be adequate. The consequence of this transformation is that the inputs to the PCA model are a measurement of the recent change of the process from the moving average operating point.

In order to accurately perform this transform, the data should be gathered at the sample frequency that matches the on-line system, often every minute or faster. This will result in collecting 525,600 samples for each measurement to cover one year of operating data. Once this transformation has been calculated, the dataset is resampled to get down to a more manageable number of samples, typically in the range of 30,000 to 50,000 samples.

V. Model Creation

Once the specific measurements have been selected and the training data set has been built, the model can be built quickly using standard tools.

A. Scaling Model Inputs

The performance of PCA models is dependent on the scaling of the inputs. The traditional approach to scaling is to divide each input by its standard deviation, σ, within the training data set.

$$X_i' = X_i / \sigma_i \quad \text{Equation 11}$$

For input sets that contain a large number of nearly identical measurements (such as multiple temperature measurements of fixed catalyst reactor beds) this approach is modified to further divide the measurement by the square root of the number of nearly identical measurements.

For redundant data groups $$X_i' = X_i / ((\sigma_i * \text{sqrt}(N))) \quad \text{Equation 12}$$

Where N=number of inputs in redundant data group

These traditional approaches can be inappropriate for measurements from continuous refining and chemical processes. Because the process is usually well controlled at specified operating points, the data distribution is a combination of data from steady state operations and data from "disturbed" and operating point change operations. These data will have overly small standard deviations from the preponderance of steady state operation data. The resulting PCA model will be excessively sensitive to small to moderate deviations in the process measurements.

For continuous refining and chemical processes, the scaling should be based on the degree of variability that occurs during normal process disturbances or during operating point changes not on the degree of variability that occurs during continuous steady state operations. For normally unconstrained variables, there are two different ways of determining the scaling factor.

First is to identify time periods where the process was not running at steady state, but was also not experiencing a significant abnormal event. A limited number of measurements act as the key indicators of steady state operations. These are typically the process key performance indicators and usually include the process feed rate, the product production rates and the product quality. These key measures are used to segment the operations into periods of normal steady state operations, normally disturbed operations, and abnormal operations. The standard deviation from the time periods of normally disturbed operations provides a good scaling factor for most of the measurements.

Figure 12:
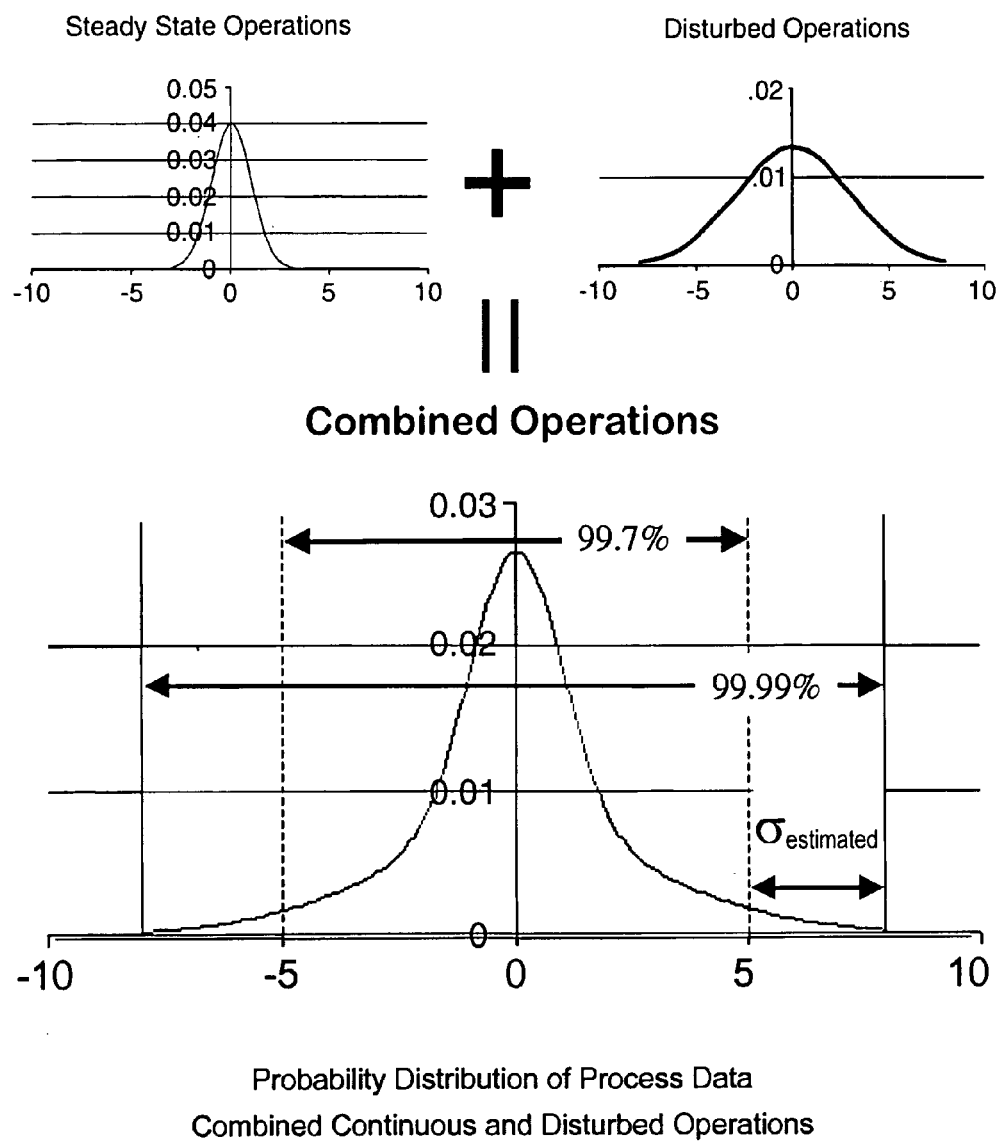
FIG. 12 shows the probability distribution of process data.

An alternative approach to explicitly calculating the scaling based on disturbed operations is to use the entire training data set as follows. The scaling factor can be approximated by looking at the data distribution outside of 3 standard deviations from the mean. For example, 99.7% of the data should lie, within 3 standard deviations of the mean and that 99.99% of the data should lie, within 4 standard deviations of the mean. The span of data values between 99.7% and 99.99% from the mean can act as an approximation for the standard deviation of the "disturbed" data in the data set. See FIG. 12.

Finally, if a measurement is often constrained (see the discussion on saturated variables) only those time periods where the variable is unconstrained should be used for calculating the standard deviation used as the scaling factor.

B. Selecting the Number of Principal Components

PCA transforms the actual process variables into a set of independent variables called Principal Components, PC, which are linear combinations of the original variables (Equation 13).

$$PC_i = A_{i,1} * X_1 + A_{i,2} * X_2 + A_{i,3} * X_3 + \quad \text{Equation 13}$$

The process will have a number of degrees of freedom, which represent the specific independent effects that influence the process. These different independent effects show up in the process data as process variation. Process variation can be due to intentional changes, such as feed rate changes, or unintentional disturbances, such as ambient temperature variation.

Each principal component models a part of the process variability caused by these different independent influences on the process. The principal components are extracted in the direction of decreasing variation in the data set, with each subsequent principal component modeling less and less of the process variability. Significant principal components represent a significant source of process variation, for example the first principal component usually represents the effect of feed rate changes since this is usually the source of the largest process changes. At some point, the developer must decide when the process variation modeled by the principal components no longer represents an independent source of process variation.

The engineering approach to selecting the correct number of principal components is to stop when the groups of variables, which are the primary contributors to the principal component no longer make engineering sense. The primary cause of the process variation modeled by a PC is identified by looking at the coefficients, $A_{i,n}$, of the original variables (which are called loadings). Those coefficients, which are relatively large in magnitude, are the major contributors to a particular PC. Someone with a good understanding of the process should be able to look at the group of variables, which are the major contributors to a PC and assign a name (e.g. feed rate effect) to that PC. As more and more PCs are extracted from the data, the coefficients become more equal in size. At this point the variation being modeled by a particular PC is primarily noise.

Figure 13:
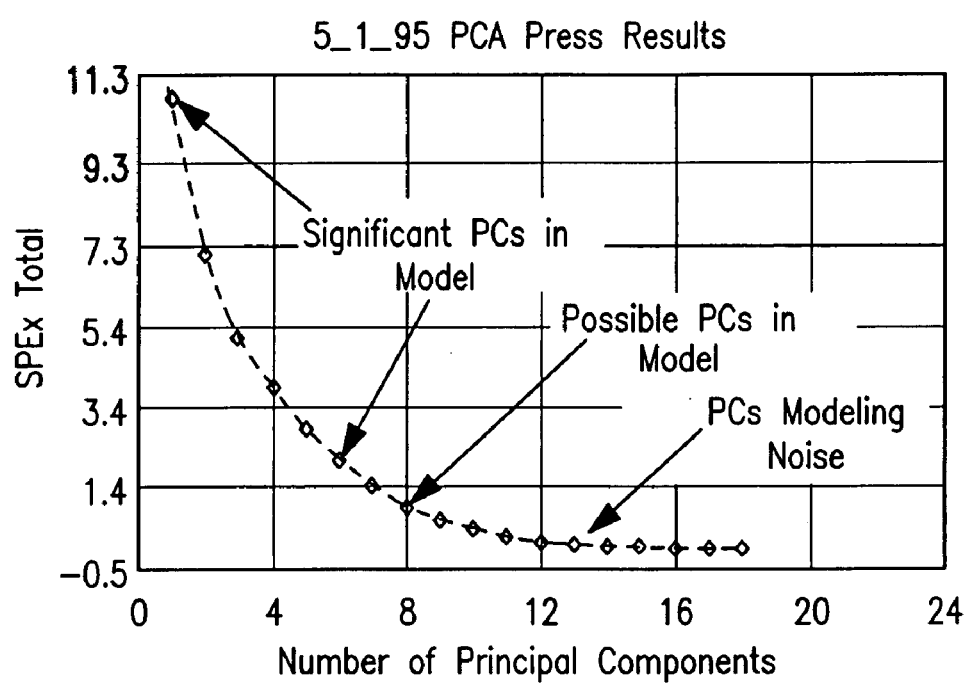
FIG. 13 shows illustration of the press statistic.

The traditional statistical method for determining when the PC is just modeling noise is to identify when the process variation being modeled with each new PC becomes constant. This is measured by the PRESS statistic, which plots the amount of variation modeled by each successive PC (FIG. 13). Unfortunately this test is often ambiguous for PCA models developed on refining and chemical processes.

VI. Model Testing & Tuning

The process data will not have a gaussian or normal distribution. Consequently, the standard statistical method of setting the trigger for detecting an abnormal event at 3 standard deviations of the error residual should not be used. Instead the trigger point needs to be set empirically based on experience with using the model.

Initially the trigger level should be set so that abnormal events would be signaled at a rate acceptable to the site engineer, typically 5 or 6 times each day. This can be determined by looking at the $SPE_x$ statistic for the training data set (this is also referred to as the Q statistic or the $DMOD_x$ statistic). This level is set so that real abnormal events will not get missed but false alarms will not overwhelm the site engineer.

A. Enhancing the Model

Once the initial model has been created, it needs to be enhanced by creating a new training data set. This is done by using the model to monitor the process. Once the model indicates a potential abnormal situation, the engineer should investigate and classify the process situation. The engineer will find three different situations, either some special process operation is occurring, an actual abnormal situation is occurring, or the process is normal and it is a false indication.

The new training data set is made up of data from special operations and normal operations. The same analyses as were done to create the initial model need to be performed on the data, and the model re-calculated. With this new model the trigger lever will still be set empirically, but now with better annotated data, this trigger point can be tuned so as to only give an indication when a true abnormal event has occurred.

Simple Engineering Models for Abnormal Event Detection

The physics, chemistry, and mechanical design of the process equipment as well as the insertion of multiple similar measurements creates a substantial amount of redundancy in the data from continuous refining and chemical processes. This redundancy is called physical redundancy when identical measurements are present, and calculational redundancy when the physical, chemical, or mechanical relationships are used to perform independent but equivalent estimates of a process condition. This class of model is called an engineering redundancy model.

I. Two Dimensional Engineering Redundancy Models

This is the simplest form of the model and it has the generic form:

$$F(y_i)=G(x_i)+\text{filtered bias}_i+\text{operator bias}+\text{error}_i \quad \text{Equation 14}$$

$$\text{raw bias}_i=F(y_i)-\{G(x_i)+\text{filtered bias}_i+\text{operator bias}\}=\text{error}_i \quad \text{Equation 15}$$

$$\text{filtered bias}_i=\text{filtered bias}_{i-1}+N^*\text{raw bias}_{i-1} \quad \text{Equation 16}$$

N—convergence factor ( e.g. 0.0001 )

Normal operating range: xmin<x<xmax

Normal model deviation: −(max_error)<error<(max_error)

The "operator bias" term is updated whenever the operator determines that there has been some field event (e.g. opening a bypass flow) which requires the model to be shifted. On the operator's command, the operator bias term is updated so that Equation 14 is exactly satisfied (error$_i$=0)

The "filtered bias" term updates continuously to account for persistent unmeasured process changes that bias the engineering redundancy model. The convergence factor, "N", is set to eliminate any persistent change after a user specified time period, usually on the time scale of days.

The "normal operating range" and the "normal model deviation" are determined from the historical data for the engineering redundancy model. In most cases the max_error value is a single value, however this can also be a vector of values that is dependent on the x axis location.

Figure 14:
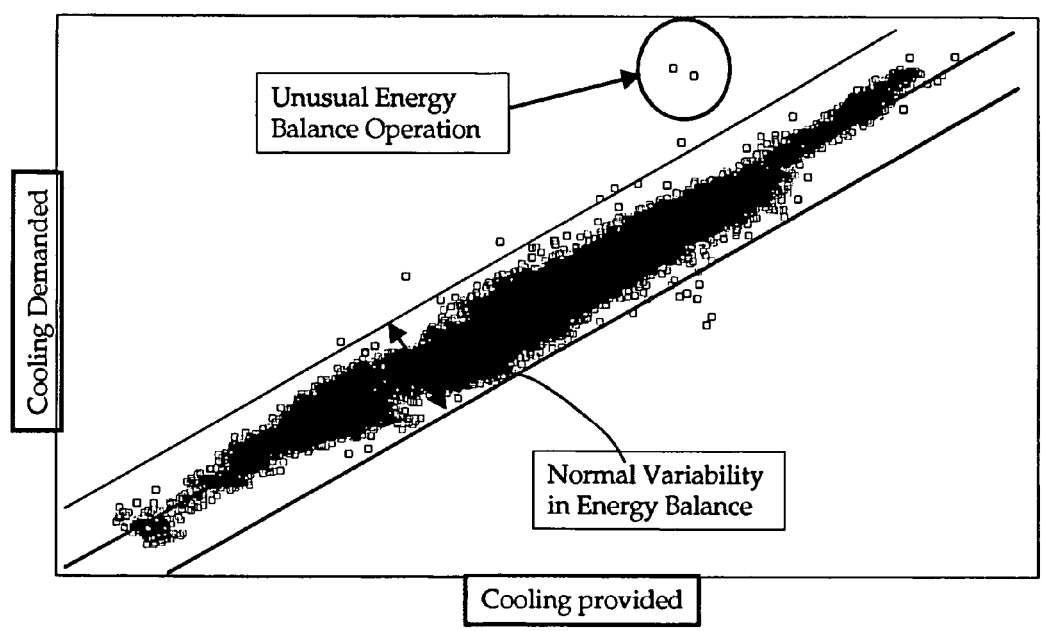
FIG. 14 shows the two-dimensional energy balance model.

Any two dimensional equation can be represented in this manner. Material balances, energy balances, estimated analyzer readings versus actual analyzer readings, compressor curves, etc. FIG. 14 shows a two dimensional energy balance.

As a case in point the flow versus valve position model is explained in greater detail.

A. The Flow versus Valve Position Model

A particularly valuable engineering redundancy model is the flow versus valve position model. This model is graphically shown in FIG. 2. The particular form of this model is:

$$\frac{\text{Flow}}{(\text{Delta\_Pressure}/\text{Delta\_Pressure}_{reference})^a} + \text{filtered bias} + \text{operator bias} = Cv(VP) \quad \text{Equation 17}$$

where:
Flow: measured flow through a control valve
Delta_Pressure=closest measured upstream pressure−closest measured downstream pressure
Delta_Pressure$_{reference}$: average Delta_Pressure during normal operation
a: model parameter fitted to historical data
Cv: valve characteristic curve determined empirically from historical data
VP: signal to the control valve (not the actual control valve position)

The objectives of this model are to:
Detecting sticking/stuck control valves
Detecting frozen/failed flow measurements
Detecting control valve operation where the control system loses control of the flow This particular arrangement of the flow versus valve equation is chosen for human factors reasons: the x-y plot of the equation in this form is the one most easily understood by the operators. It is important for any of these models that they be arranged in the way which is most likely to be easily understood by the operators.

B. Developing the Flow Versus Valve Position Model

Figure 15:
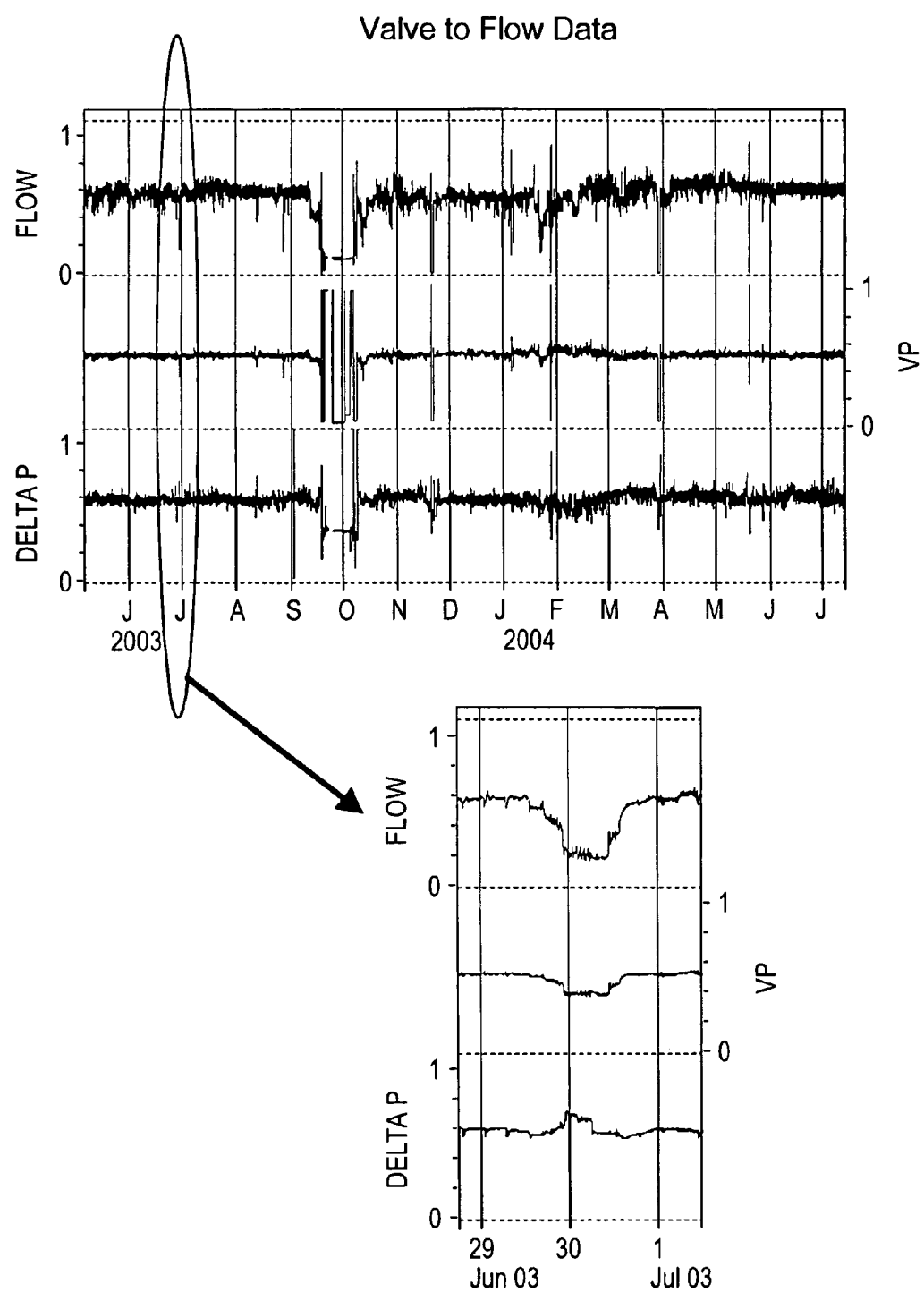
FIG. 15 shows a typical stretch of flow, valve position, and delta pressure data with the long period of constant operation.

Because of the long periods of steady state operation experienced by continuous refining and chemical processes, a long historical record (1 to 2 years) may be required to get sufficient data to span the operation of the control valve. FIG. 15 shows a typical stretch of Flow, Valve Position, and Delta Pressure data with the long periods of constant operation. The first step is to isolate the brief time periods where there is some significant variation in the operation, as shown. This should be then mixed with periods of normal operation taken from various periods in history.

Often, either the Upstream_Pressure (often a pump discharge) or the Downstream_Pressure is not available. In those cases the missing measurement becomes a fixed model parameter in the model. If both pressures are missing then it is impossible to include the pressure effect in the model.

The valve characteristic curve can be either fit with a linear valve curve, with a quadratic valve curve or with a piecewise linear function. The piecewise linear function is the most flexible and will fit any form of valve characteristic curve.

The theoretical value for "a" is ½ if the measurements are taken directly across the valve. Rarely are the measurements positioned there. "a" becomes an empirically determined parameter to account for the actual positioning of the pressure measurements.

Often there will be very few periods of time with variations in the Delta_Pressure. The noise in the Delta_Pressure during the normal periods of operation can confuse the model-fitting program. To overcome this, the model is developed in two phases, first where a small dataset, which only contains periods of Delta_Pressure variation is used to fit the model. Then the pressure dependent parameters ("a" and perhaps the missing upstream or downstream pressure) are fixed at the values determined, and the model is re-developed with the larger dataset.

C. Fuzzy-net Processing of Flow Versus Valve Abnormality Indications

Figure 16:
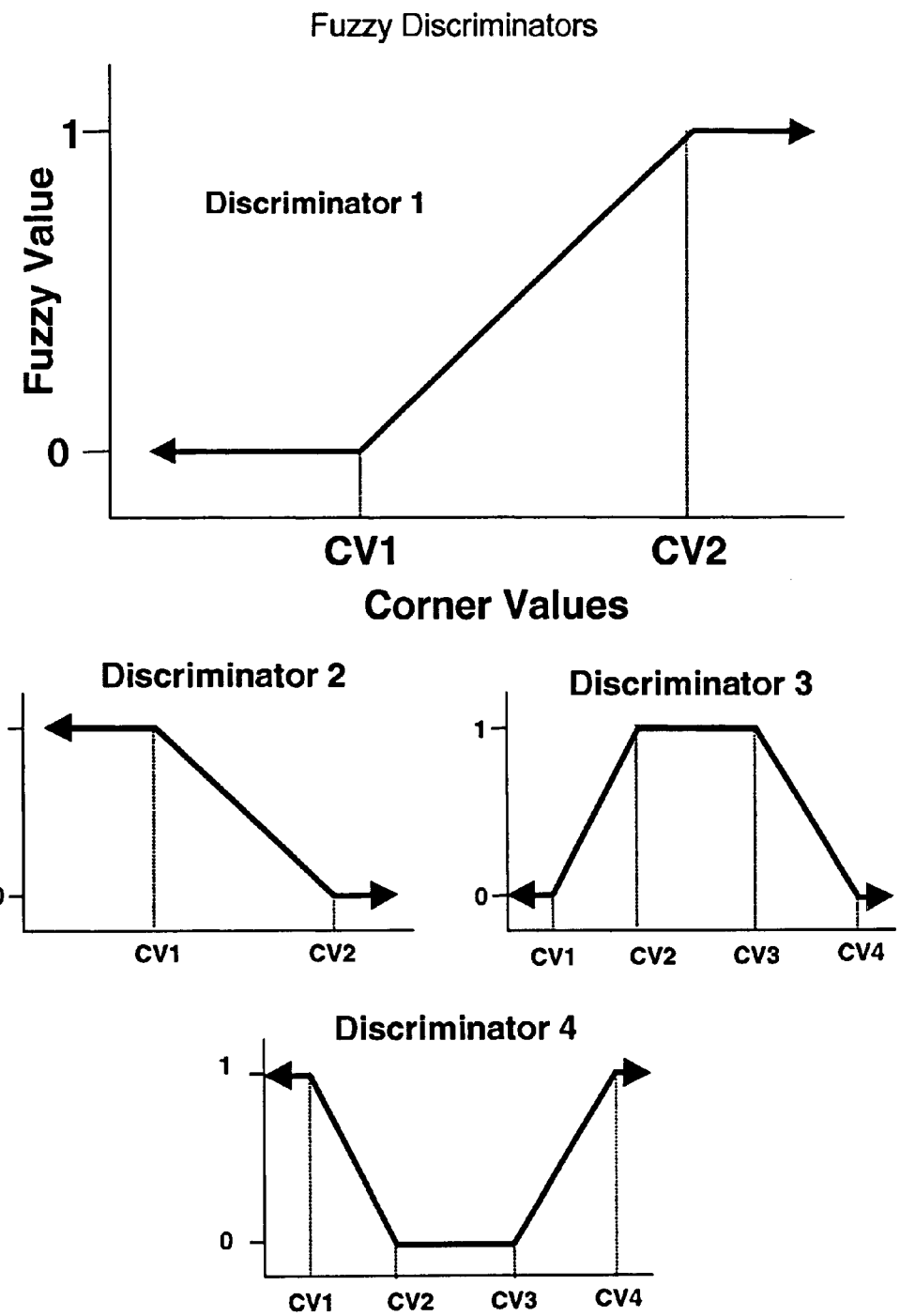
FIG. 16 shows a type 4 fuzzy discriminator.

As with any two-dimensional engineering redundancy model, there are two measures of abnormality, the "normal operating range" and the "normal model deviation". The "normal model deviation" is based on a normalized index: the error/max_error. This is fed into a type 4 fuzzy discriminator (FIG. 16). The developer can pick the transition from normal (value of zero) to abnormal (value of 1) in a standard way by using the normalized index.

The "normal operating range" index is the valve position distance from the normal region. It typically represents the operating region of the valve where a change in valve position will result in little or no change in the flow through the valve. Once again the developer can use the type 4 fuzzy discriminator to cover both the upper and lower ends of the normal operating range and the transition from normal to abnormal operation.

D. Grouping Multiple Flow/Valve Models

A common way of grouping Flow/Valve models which is favored by the operators is to put all of these models into a single fuzzy network so that the trend indicator will tell them that all of their critical flow controllers are working. In that case, the model indications into the fuzzy network (FIG. 4) will contain the "normal operating range" and the "normal model deviation" indication for each of the flow/valve models. The trend will contain the discriminator result from the worst model indication.

Figure 17:
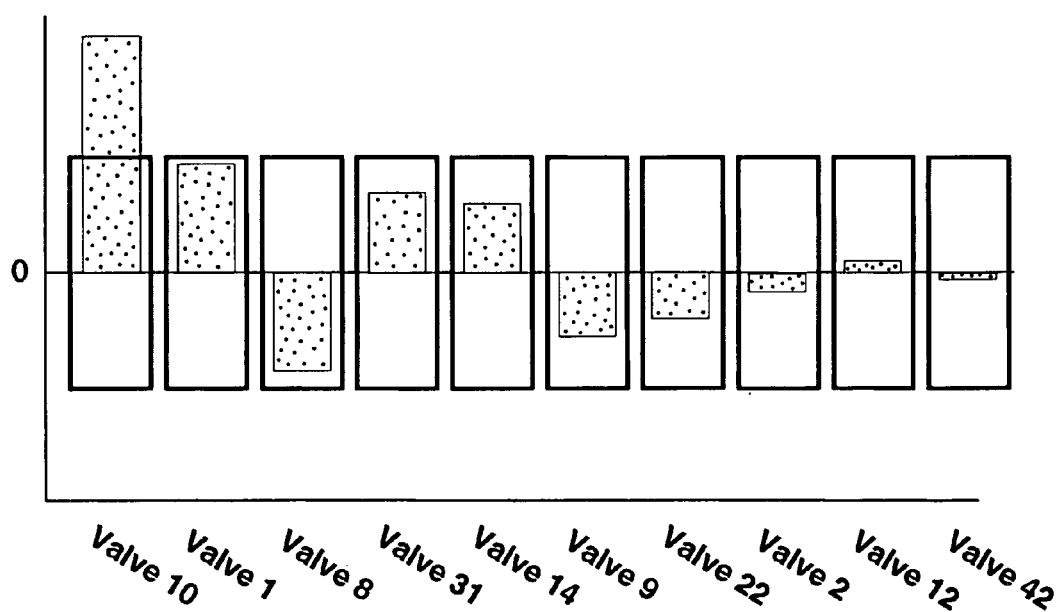
FIG. 17 shows a flow versus valve Pareto chart.

When a common equipment type is grouped together, another operator favored way to look at this group is through a Pareto chart of the flow/valves (FIG. 17). In this chart, the top 10 abnormal valves are dynamically arranged from the most abnormal on the left to the least abnormal on the right. Each Pareto bar also has a reference box indicating the degree of variation of the model abnormality indication that is within normal. The chart in FIG. 17 shows that "Valve 10" is substantially outside the normal box but that the others are all behaving normally. The operator would next investigate a plot for "Valve 10" similar to FIG. 2 to diagnose the problem with the flow control loop.

II. Multidimensional Engineering Redundancy Models

Once the dimensionality gets larger than 2, a single "PCA like" model is developed to handle a high dimension engineering redundancy check. Examples of multidimensional redundancy are:

pressure 1=pressure 2= . . . =pressure n material flow into process unit 1=material flow out of process unit 1= . . . =material flow into process unit 2

Because of measurement calibration errors, these equations will each require coefficients to compensate. Consequently, the model set that must be first developed is:

$$F_1(y_i) = a_1 G_1(x_i) + \text{filtered bias}_{1,i} + \text{operator bias}_1 + \text{error}_{1,i}$$

$$F_2(y_i) = a_n G_2(x_i) + \text{filtered bias}_{2,i} + \text{operator bias}_2 + \text{error}_{2,i}$$

$$F_n(y_i) = a_n G_n(x_i) + \text{filtered bias}_{n,i} + \text{operator bias}_n + \text{error}_{n,i} \quad \text{Equation 18}$$

These models are developed in the identical manner that the two dimensional engineering redundancy models were developed.

Figure 3:
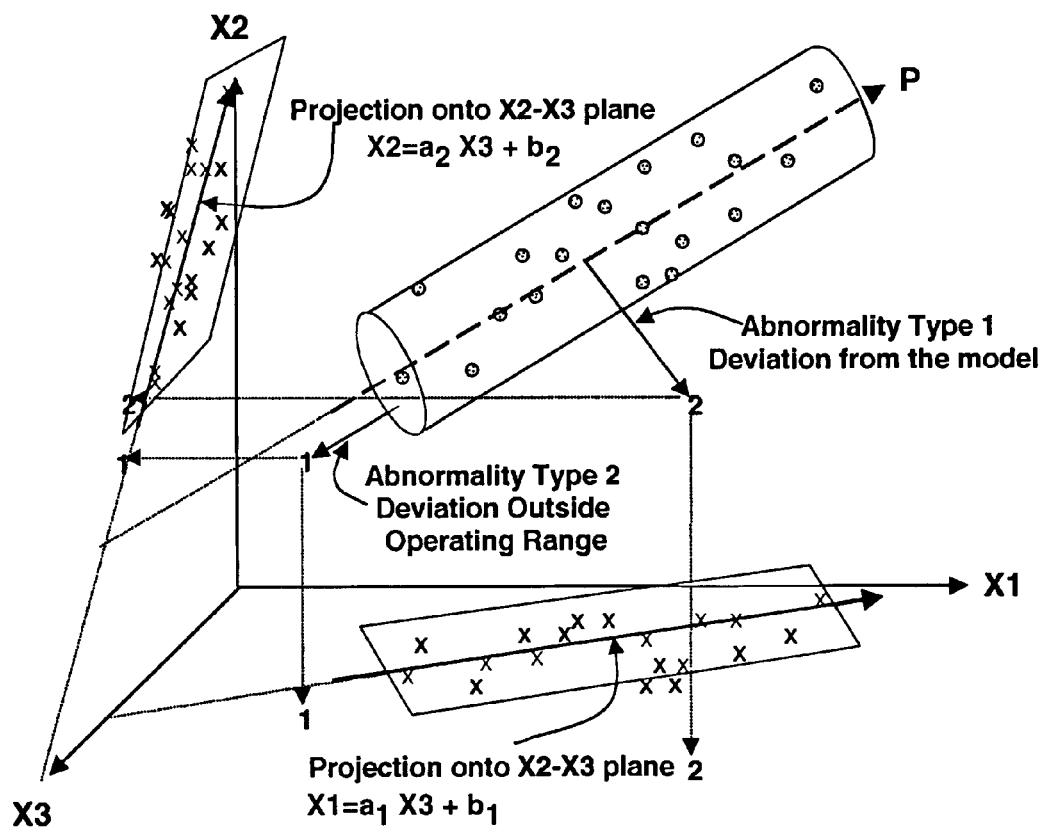
FIG. 3 shows three-dimensional redundancy expressed as a PCA model.

This set of multidimensional checks are now converted into "PCA like" models. This conversion relies on the interpretation of a principle component in a PCA model as a model of an independent effect on the process where the principle component coefficients (loadings) represent the proportional change in the measurements due to this independent effect. In FIG. 3, there are three independent and redundant measures, X1, X2, and X3. Whenever X3 changes by one, X1 changes by $a_1$ and X2 changes by $a_2$. This set of relationships is expressed as a single principle component model, P, with coefficients in unscaled engineering units as:

$$P = a_1 X1 + a_2 X2 + a_3 X3 \quad \text{Equation 19}$$

Where $a_3 = 1$

This engineering unit version of the model can be converted to a standard PCA model format as follows:

Drawing analogies to standard statistical concepts, the conversion factors for each dimension, X, can be based on the normal operating range. For example, using 3σ around the mean to define the normal operating range, the scaled variables are defined as:

$$X_{scale} = X \text{ normal operating range}/6\sigma \quad \text{Equation 20}$$

(99.7% of normal operating data should fall within 3 σ of the mean)

$$X_{mid} = X_{mid\ point\ of\ operating\ range} \quad \text{Equation 21}$$

(explicitly defining the "mean" as the mid point of the normal operating range)

$$X' = (X - X_{mid})/X_{scale} \quad \text{Equation 22}$$

(standard PCA scaling once mean and C are determined)

Then the P' Loadings for $X_i$ are:

$$b_i = (a_i / X_{i-scale}) \left( \sum_{k=1}^{N} (a_k / X_{k-scale})^2 \right)^{1/2} \quad \text{Equation 23}$$

(the requirement that the loading vector be normalized)

This Transforms P to $$P' = b_1 * X1 + b_2 * X2 + \ldots + b_n * XN \quad \text{Equation 24}$$

$$P' \text{ "standard deviation"} = b_1 + b_2 + \ldots + b_n \quad \text{Equation 25}$$

With this conversion, the multidimensional engineering redundancy model can now be handled using the standard PCA structure for calculation, exception handling, operator display and interaction.

Deploying Models and Simple Engineering Models for Abnormal Event Detection

I. Operator and Known Event Suppression

Suppression logic is required for the following:

Provide a way to eliminate false indications from measurable unusual events

Provide a way to clear abnormal indications that the operator has investigated

Provide a way to temporarily disable models or measurements for maintenance

Provide a way to disable bad acting models until they can be retuned

Provide a way to permanently disable bad acting instruments.

Figure 18:
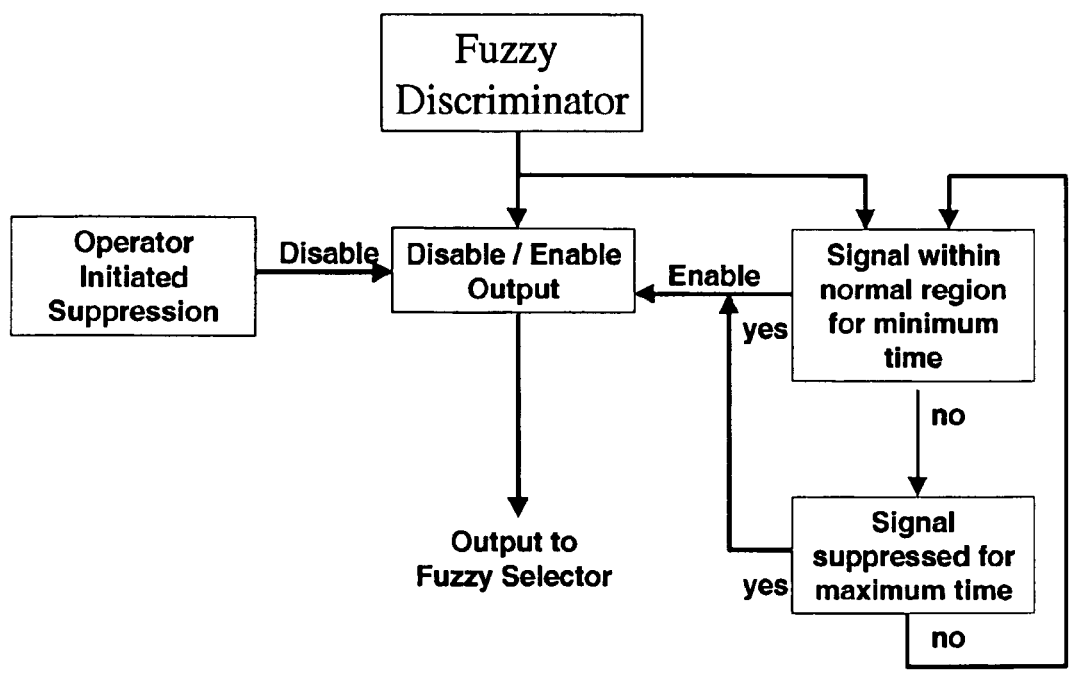
FIG. 18 shows a schematic diagram of operator suppression logic.
Figure 19:
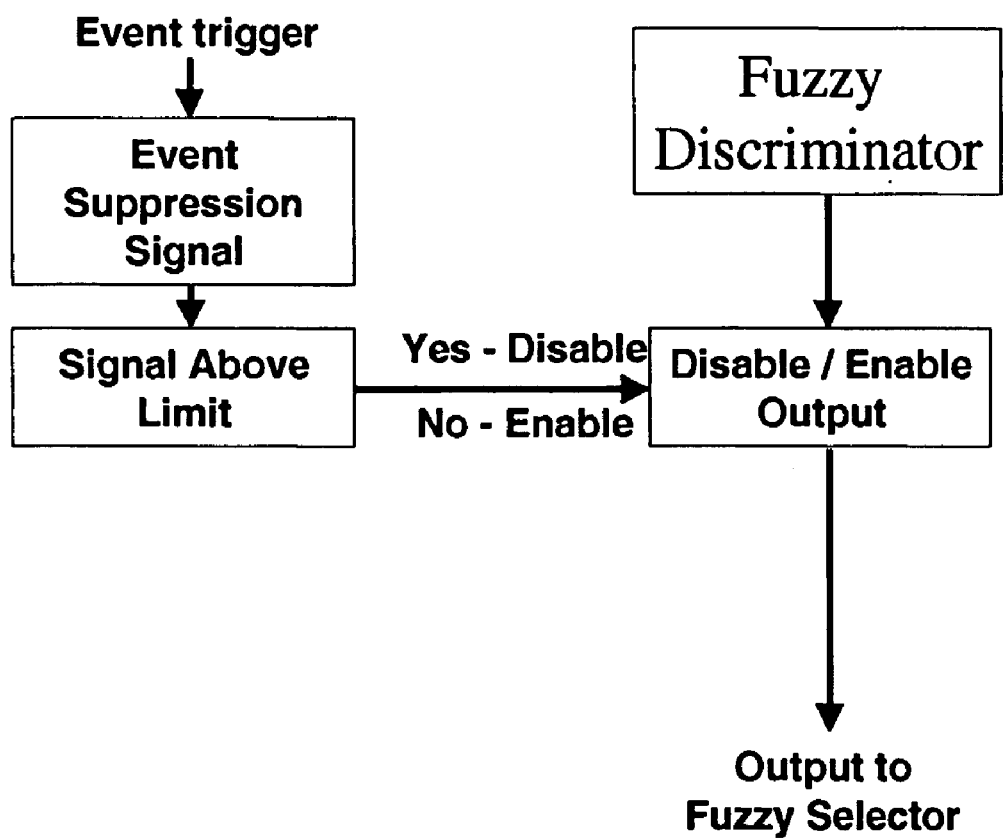
FIG. 19 shows a schematic diagram of event suppression logic.

There are two types of suppression. Suppression which is automatically triggered by an external, measurable event and suppression which is initiated by the operator. The logic behind these two types of suppression is shown in FIGS. 18 and 19. Although these diagrams show the suppression occurring on a fuzzified model index, suppression can occur on a particular measurement, on a particular model index, on an entire model, or on a combination of models within the process area.

For operator initiated suppression, there are two timers, which determine when the suppression is over. One timer verifies that the suppressed information has returned to and remains in the normal state. Typical values for this timer are from 15-30 minutes. The second timer will reactivate the abnormal event check, regardless of whether it has returned to the normal state. Typical values for this timer are either equivalent to the length of the operator's work shift (8 to 12 hours) or a very large time for semi-permanent suppression.

Figure 20:
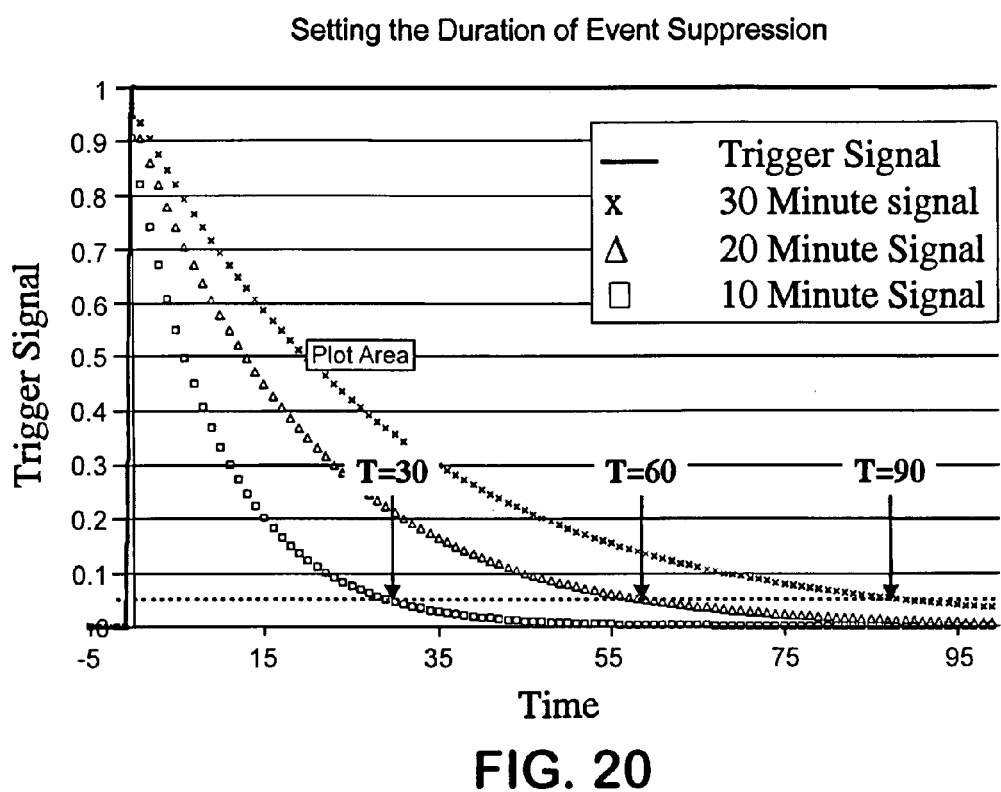
FIG. 20 shows the setting of the duration of event suppression.

For event based suppression, a measurable trigger is required. This can be an operator setpoint change, a sudden measurement change, or a digital signal. This signal is converted into a timing signal, shown in FIG. 20. This timing signal is created from the trigger signal using the following equations:

$Y_n = P*Y_{n-1} + (1-P)*X_n$ Exponential filter equation  Equation 26

$P = \text{Exp}(-T_s/T_f)$ Filter constant calculation  Equation 27

$Z_n = X_n - Y_n$ Timing signal calculation  Equation 28 where:
$Y_n$ the current filtered value of the trigger signal
$Y_{n-1}$ the previous filtered value of the trigger signal
$X_n$ the current value of the trigger signal
$Z_n$ the timing signal shown in FIG. 20
P the exponential filter constant
$T_s$ the sample time of the measurement
$T_f$ the filter time constant As long as the timing signal is above a threshold (shown as 0.05 in FIG. 20), the event remains suppressed. The developer sets the length of the suppression by changing the filter time constant, $T_f$. Although a simple timer could also be used for this function, this timing signal will account for trigger signals of different sizes, creating longer suppressions for large changes and shorter suppressions for smaller changes.

Figure 21:
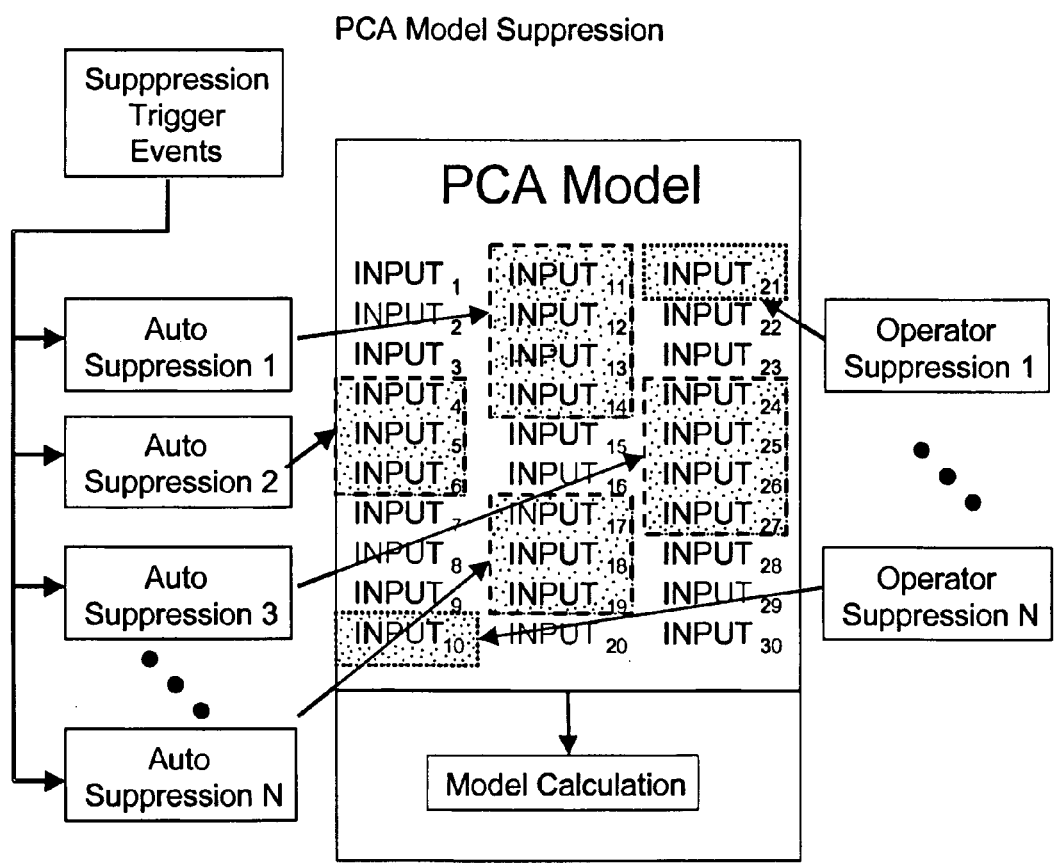
FIG. 21 shows the event suppression and the operator suppression disabling predefined sets of inputs in the PCA model.

FIG. 21 shows the event suppression and the operator suppression disabling predefined sets of inputs in the PCA model. The set of inputs to be automatically suppressed is determined from the on-line model performance. Whenever the PCA model gives an indication that the operator does not want to see, this indication can be traced to a small number of individual contributions to the Sum of Error Square index. To suppress these individual contributions, the calculation of this index is modified as follows:

$$E^2 = \sum_{i=1}^{n} \Box w_i \cdot e_i^2 \qquad \text{Equation 29}$$

$w_i$—the contribution weight for input i (normally equal to 1)
$e_i$—the contribution to the sum of error squared from input i When a trigger event occurs, the contribution weights are set to zero for each of the inputs that are to be suppressed. When these inputs are to be reactivated, the contribution weight is gradually returned to a value of 1.

II. PCA Model Decomposition

Although the PCA model is built using a broad process equipment scope, the model indices can be segregated into groupings that better match the operators' view of the process and can improve the sensitivity of the index to an abnormal event.

Referring again to Equation 29, we can create several Sum of Error Square groupings:

$$E_1^2 = \sum_{i=1}^{l} w_i e_i^2$$

$$E_2^2 = \sum_{i=l}^{k} w_i e_i^2$$

$$\vdots$$

$$E_m^2 = \sum_{i=k}^{n} w_i e_i^2 \qquad \text{Equation 30}$$

Usually these groupings are based around smaller sub-units of equipment (e.g. reboiler section of a tower), or are sub-groupings, which are relevant to the function of the equipment (e.g. product quality).

Since each contributor, $e_i$, is always adding to the sum of error square based on process noise, the size of the index due to noise increases linearly with the number of inputs contributing to the index. With fewer contributors to the sum of error square calculation, the signal to noise ratio for the index is improved, making the index more responsive to abnormal events.

In a similar manner, each principle component can be subdivided to match the equipment groupings and an index analogous to the Hotelling $T^2$ index can be created for each subgroup.

$$P_{1,a} = \sum_{i=1}^{l} b_{1,i} x_i \qquad \text{Equation 31}$$

$$P_{1,b} = \sum_{i=l}^{k} b_{1,i} x_i$$

$$P_{1,c} = \sum_{i=k}^{n} b_{1,i} x_i$$

$$P_{2,a} = \sum_{i=1}^{l} b_{2,i} x_i$$

$$P_{2,b} = \sum_{i=l}^{k} b_{2,i} x_i$$

$$P_{2,c} = \sum_{i=k}^{n} b_{2,i} x_i$$

$$T_a^2 = \sum_{i=1}^{m} P_{i,a}^2$$

$$T_b^2 = \sum_{i=1}^{m} P_{i,b}^2$$

$$T_c^2 = \sum_{i=1}^{m} P_{i,c}^2$$

The thresholds for these indices are calculated by running the testing data through the models and setting the sensitivity of the thresholds based on their performance on the test data.

These new indices are interpreted for the operator in the identical manner that a normal PCA model is handled. Pareto charts based on the original inputs are shown for the largest contributors to the sum of error square index, and the largest contributors to the largest P in the $T^2$ calculation.

III. Overlapping PCA Models

Inputs will appear in several PCA models so that all interactions affecting the model are encompassed within the model. This can cause multiple indications to the operator when these inputs are the major contributors to the sum of error squared index.

To avoid this issue, any input, which appears in multiple PCA models, is assigned one of those PCA models as its primary model. The contribution weight in Equation 29 for the primary PCA model will remain at one while for the non-primary PCA models, it is set to zero.

IV. Operator Interaction & Interface Design

Figure 22:
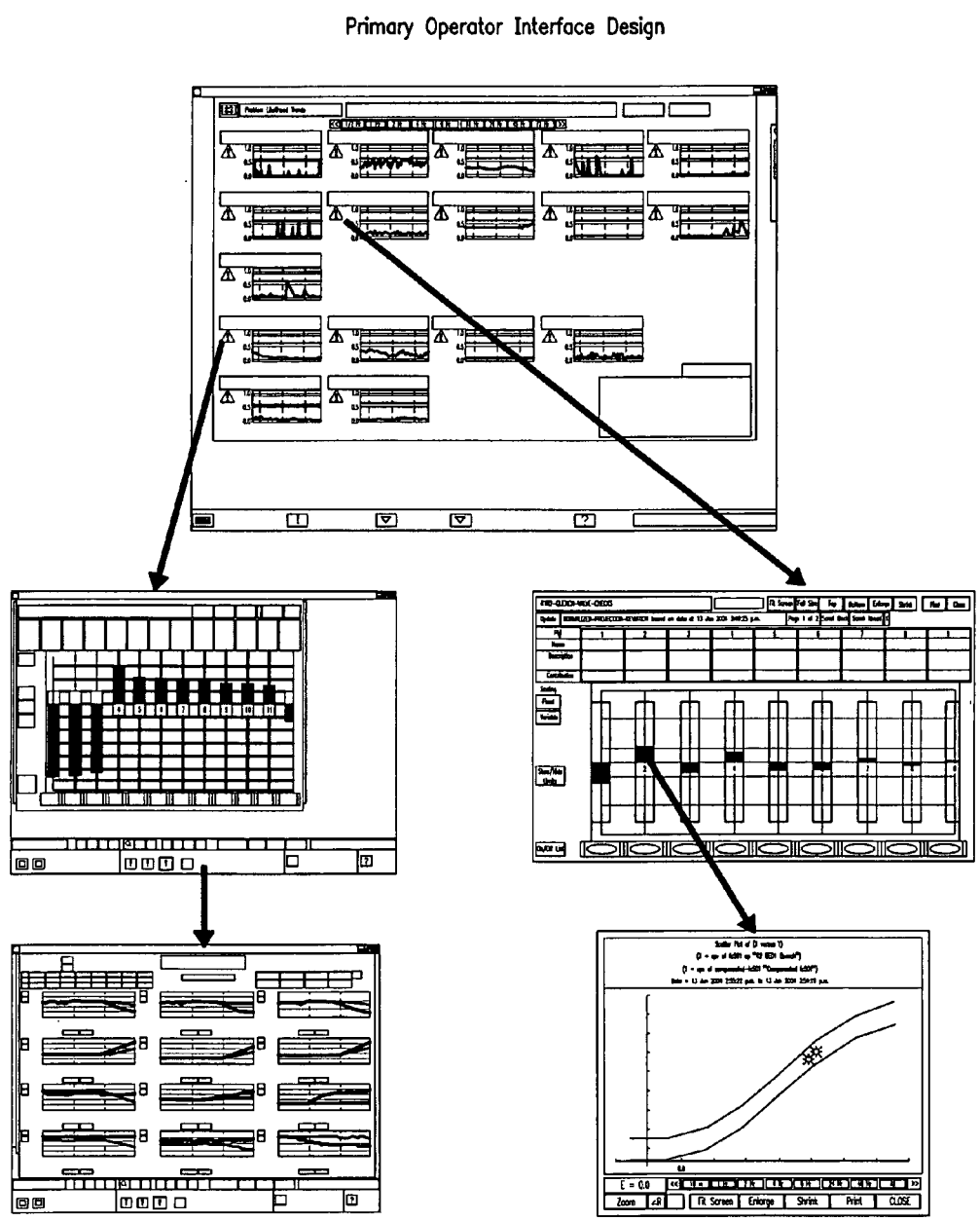
FIG. 22 shows how design objectives are expressed in the primary interfaces used by the operator.

The primary objectives of the operator interface are to:

Provide a continuous indication of the normality of the major process areas under the authority of the operator Provide rapid (1 or 2 mouse clicks) navigation to the underlying model information Provide the operator with control over which models are enabled. FIG. 22 shows how these design objectives are expressed in the primary interfaces used by the operator.

Figure 4:
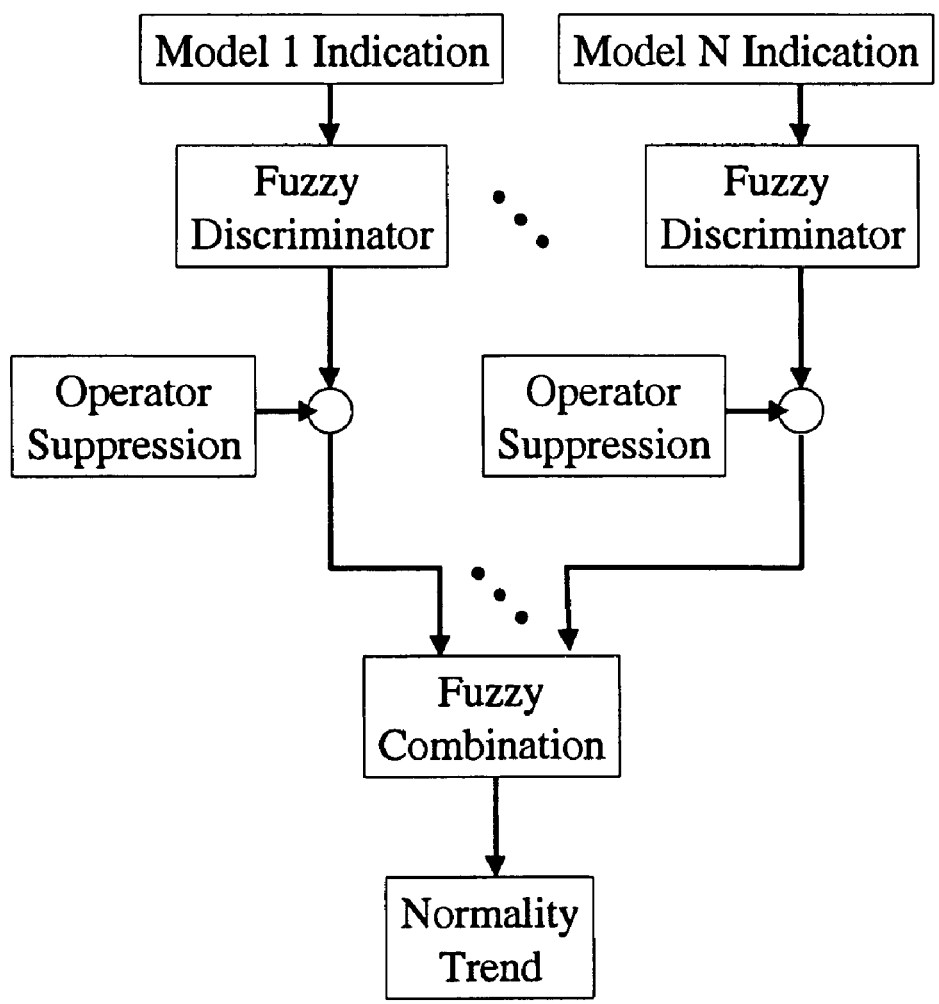
FIG. 4 shows a schematic diagram of a fuzzy network setup.
Figure 5:
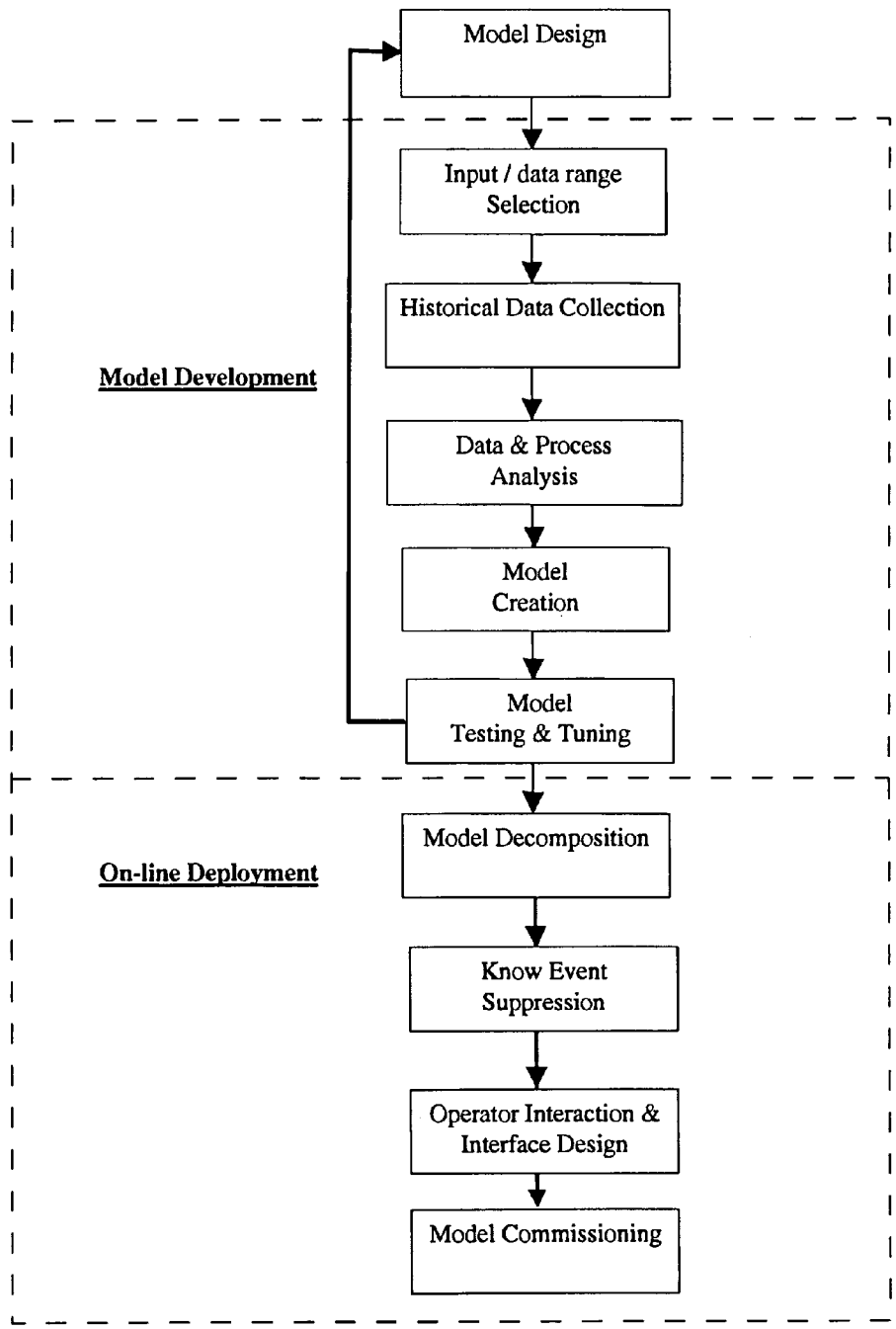
FIG. 5 shows a schematic diagram of the overall process for developing an abnormal event application.

The final output from a fuzzy Petri net is a normality trend as is shown in FIG. 4. This trend represents the model index that indicates the greatest likelihood of abnormality as defined in the fuzzy discriminate function. The number of trends shown in the summary is flexible and decided in discussions with the operators. On this trend are two reference lines for the operator to help signal when they should take action, a line typically set at a value of 0.6 and a line typically set at a value of 0.9. These lines provide guidance to the operator as to when he is expected to take action. When the trend crosses the 0.6 line, the triangle in FIG. 4 will turn yellow and when the trend crosses the 0.9 line, the triangle will turn red. The triangle also has the function that it will take the operator to the display associated with the model giving the most abnormal indication.

If the model is a PCA model or it is part of an equipment group (e.g. all control valves), selecting the triangle will create a Pareto chart. For a PCA model, of the dozen largest contributors to the model index, this will indicate the most abnormal (on the left) to the least abnormal (on the right). Usually the key abnormal event indicators will be among the first 2 or 3 measurements. The Pareto chart includes a box around each bar to provide the operator with a reference as to how unusual the measurement can be before it is regarded as an indication of abnormality.

For PCA models, operators are provided with a trend Pareto, which matches the order in the bar chart Pareto. With the trend Pareto, each plot has two trends, the actual measurement and an estimate from the PCA model of what that measurements should have been if everything was normal.

For valve/flow models, the detail under the Pareto will be the two dimensional flow versus valve position model plot. From this plot the operator can apply the operator bias to the model.

If there is no equipment grouping, selecting the triangle will take the operator right to the worst two-dimensional model under the summary trend.

Operator suppression is done at the Pareto chart level by selecting the on/off button beneath each bar.

BIBLIOGRAPHY

I. U.S. Patent Documents

1 U.S. Pat. No. 5,859,964 Jan. 12, 1999 Wang, et al, "System and method for performing real time data acquisition, process modeling and fault detection of wafer fabrication processes"

2 U.S. Pat. No. 5,949,678 Sep. 7, 1999 Wold, et al, "Method for Monitoring Multivariable Processes"

3 U.S. Pat. No. 6,522,978 Feb. 18, 2002 Chen, et al, "Paper web breakage prediction using principal components analysis and classification and regression trees".

4 U.S. Pat. No. 6,368,975 Apr. 9, 2002 Balasubramhanya, et al, "Method and apparatus for monitoring a process by employing principal component analysis"

5 U.S. Pat. No. 6,466,877 Oct. 15, 2002 Chen, et al, "Paper web breakage prediction using principal components analysis and classification and regression trees"

6 U.S. Pat. No. 6,521,080 Feb. 18, 2003 Balasubramhanya, et al, "Method and apparatus for monitoring a process by employing principal component analysis"

7 U.S. Pat. No. 6,564,119 May 13, 2003 Vaculik, et al, "Multivariate Statistical Model Based System for Monitoring the Operation of a Continuous Caster and Detecting the Onset of Impending Breakouts"

8 U.S. Pat. No. 6,636,842 Oct. 21, 2003 Zambrano, et al, "System and method for controlling an industrial process utilizing process trajectories"

II. Literature

1. Cardoso, J. et al *Fuzzy Petri Nets: An Overview*, 13th Word Congress of IFAC, Vol. I: Identification II, Discrete Event Systems, San Francisco, Calif., USA, Jun. 30-Jul. 5, 1996, pp. 443-448.

2. Jackson, E. *"A User's Guide to Principal Component Analysis"*, John Wiley & Sons, 1991

3. Kourti, T. "Process Analysis and Abnormal Situation Detection: From Theory to Practice", IEEE Control Systems Magazine, October 2002, pp. 10-25

4. Ku, W. "Disturbance Detection and Isolation for Statistical Process Control in Chemical Processes", PhD Thesis, Lehigh University, Aug. 17, 1994

5. Martens, H., & Naes, T., "Multivariate Calibration", John Wiley & Sons, 1989

6. Piovoso, M. J., et al. "Process Data Chemometrics", IEEE Trans on Instrumentation and Measurement, Vol. 41, No. 2, April 1992, pp. 262-268

What is claimed is:

1. A system for abnormal event detection in an industrial process comprising a set of models including principal component analysis models to detect abnormal operations in said process wherein said process has been divided into equipment groups with minimal interaction between groups and process operating modes with process measurements as inputs to said models wherein separate principal component analysis models correspond to an equipment group and process operating modes and wherein each principal component analysis model is a linear combination of process measurements.

2. The system of claim 1 wherein said equipment groups include all major material and energy interactions in the same group.

3. The system of claim 1 wherein said equipment groups include quick recycles in the same group.

4. The system of claim 1 wherein said equipment groups include feed forward and feed back paths between upstream and downstream equipment groups.

5. The system of claim 1 wherein the operating modes are specific time periods wherein process behavior is significantly different.

6. The system of claim 1 wherein inputs to the system are measurements that measure the performance and/or physical state of the system of the process.

7. The system of claim 6 wherein said input measurements have a signal to noise ratio above a predetermined value.

8. The system of claim 6 wherein said input measurements satisfy a cross correlation test.

9. The system of claim 6 wherein the inputs determine the physical state of the system.

10. The system of claim 9 wherein the signal to noise ratio is above 4.

11. The system of claim 9 wherein said inputs to the system include temperatures, and/or pressures, and/or flows.

12. The system of claim 10 further comprising an operator interface.

13. The system of claim 11 wherein said output from said fuzzy Petri nets is a normality trend.

14. The system of claim 1 wherein models outputs are combined using fuzzy Petri nets.

15. The system of claim 1 wherein said inputs to said principle component analysis model are scaled.

16. The system of claim 15 wherein said operator interface includes Pareto charts.

17. The system of claim 15 wherein said operator interface includes an indication of the model that gives the most abnormal indication.

18. The system of claim 15 wherein said operator interface includes a continuous indication of normality of major process areas.

19. The system of claim 15 wherein the fuzzy net includes a normality trend that indicates the greatest likelihood of abnormality.

20. The system of claim 18 wherein said engineering models are redundancy checks based on known engineering relationships.

21. The system of claim 1 further comprising engineering models.

22. The system of claim 21 wherein said redundancy checks are 2×2 checks.

23. The system of claim 21 wherein said redundancy checks are multiple redundancy checks.

24. The system of claim 1 further comprising inferential measurements.

25. The system of claim 1 wherein said set of models has been restructured based on process operations.

26. The system of claim 1 wherein said industrial process is a chemical process.

27. The system of claim 1 wherein said industrial process is a petrochemical process.

28. The system of claim 1 wherein said industrial process is a refining process.

29. A method for developing an abnormal event detector for a industrial process comprising:
    a) dividing the process into equipment groups with minimal interaction between groups and/or operating modes having specific time periods where process behavior is significantly different,
    b) determining input variables and their operating range for said equipment and/or operating modes,
    c) determining historical data for said input variables.
    d) determining a historical data training set having no abnormal operation,
    e) creating a set of models including principal component analysis models included in the set, one for each of said equipment groups and/or operating modes using said historical data training set wherein each principal component is a linear combination of process measurements.

30. The method of claim 29 further comprising creating engineering models based on known engineering relationships and combining with the set of models for said equipment groups and/or operating mode.

31. The method of claim 29 wherein said models are recalibrated with a new historical data training set.

32. The method of claim 31 further comprising the step of combining output from the models using fuzzy Petri nets.

33. The method of claim 29 further comprising the step of displaying output from the set of models as a normality trend.

34. The method of claim 29 further comprising the step of using fuzzy Petri nets to interpret output from said set of models as normal or abnormal.

35. The method of claim 29 further comprising the step of using fuzzy Petri nets to combine model outputs into a single continuous summary of normality and abnormality.

36. The method of claim 29 further comprising the step of supplementing the principal components analysis models with known engineering relationships.

37. The method of claim 36 wherein said known engineering relationships are 2×2 redundancy checks.

38. The method of claim 36 wherein said known engineering relationships are multidimensional redundancy checks.

39. The method of claim 36 further comprising the step of using fuzzy Petri nets to combine the set of principal components analysis models with known engineering relationships.

40. The method of claim 29 wherein said industrial process is a chemical process.

41. The method of claim 29 wherein said industrial process is a petrochemical process.

42. The method of claim 29 wherein said industrial process is a refining process.

43. A method for determining an abnormal event for an industrial process comprising comparing online measurements from said industrial process to measurements for normal operations using a set of models including principal component analysis models wherein said process has been divided into equipment groups having minimal interaction between groups and/or operating modes and/or engineering models wherein a principal component analysis model corresponds to each equipment group and each principal component is a linear combination of process measurements.

44. The method of claim 43 wherein output from the set of models is combined using fuzzy Petri nets to provide a continuous summary indication of the normality of the process.

45. The method of claim 44 further comprising the step of creating Pareto chart for an equipment group, an operating mode, or engineering model.

46. The method of claim 43 wherein said industrial process is a chemical process.

47. The method of claim 43 wherein said industrial process is a petrochemical process.

48. The method of claim 43 wherein said industrial process is a refining process.

* * * * *